United States Patent
Lee

(10) Patent No.: US 9,382,900 B2
(45) Date of Patent: Jul. 5, 2016

(54) WIND POWER GENERATION UNIT, WIND FARM, AND ARRANGEMENT STRUCTURE AND CONTROL METHOD OF THE SAME

(71) Applicant: DOOSAN HEAVY INDUSTRIES & CONSTRUCTION CO., LTD., Gyeongsangnam-do (KR)

(72) Inventor: Ik Hyung Lee, Seoul (KR)

(73) Assignee: DOOSAN HEAVY INDUSTRIES & CONSTRUCTION CO., LTD., Gyeongsangnam-do (KR)

(*) Notice: Subject to any disclaimer, the term of this patent is extended or adjusted under 35 U.S.C. 154(b) by 146 days.

(21) Appl. No.: 14/341,395

(22) Filed: Jul. 25, 2014

(65) Prior Publication Data

US 2015/0233355 A1   Aug. 20, 2015

(30) Foreign Application Priority Data

Feb. 20, 2014 (KR) .......................... 10-2014-0019747

(51) Int. Cl.
*F03D 9/00* (2016.01)
*F03D 7/02* (2006.01)

(52) U.S. Cl.
CPC .............. *F03D 9/005* (2013.01); *F03D 7/0296* (2013.01)

(58) Field of Classification Search
CPC ................................ F03D 9/005; F03D 7/0296
USPC ....................................................... 290/44, 55
See application file for complete search history.

(56) References Cited

U.S. PATENT DOCUMENTS

| 2006/0131889 A1* | 6/2006 | Corten ...................... F03D 1/04 290/43 |
| 2006/0132994 A1* | 6/2006 | Delmerico .............. F03D 7/028 361/20 |
| 2006/0232073 A1* | 10/2006 | Corten .................... F03B 15/06 290/44 |
| 2010/0260604 A1* | 10/2010 | Dabiri ....................... F03D 9/00 416/120 |
| 2012/0029712 A1* | 2/2012 | Parikh ....................... H02J 3/00 700/287 |

(Continued)

FOREIGN PATENT DOCUMENTS

| FR | 2868483 A1 | 10/2005 |
| GB | 2481461 A | 12/2011 |

(Continued)

OTHER PUBLICATIONS

Notice of Allowance issued Oct. 24, 2014 in Korean Patent Application No. 10-2014-0019747.

(Continued)

*Primary Examiner* — Tulsidas C Patel
*Assistant Examiner* — Sean Gugger
(74) *Attorney, Agent, or Firm* — Baker & McKenzie LLP

(57) ABSTRACT

A wind farm includes at least two first-direction wind power generation units and at least one second-direction wind power generation unit. The first-direction wind power generation units are spaced apart from each other at a predetermined interval and have blades that rotate in a same direction. The second-direction wind power generation unit is located adjacent to and between the first-direction wind power generation units and has blades that rotate in an opposite direction to a rotational direction of the first-direction wind power generation units.

22 Claims, 26 Drawing Sheets

(56) References Cited

U.S. PATENT DOCUMENTS

| | | | |
|---|---|---|---|
| 2012/0267892 A1* | 10/2012 | Matsuda | F03D 7/022 290/44 |
| 2013/0041636 A1* | 2/2013 | Craig | F03G 7/00 703/2 |
| 2013/0060472 A1* | 3/2013 | Parikh | H02J 3/00 702/3 |
| 2013/0103202 A1* | 4/2013 | Bowyer | F03D 7/0292 700/275 |
| 2013/0144449 A1* | 6/2013 | Dalsgaard | F03D 7/048 700/287 |
| 2014/0003939 A1* | 1/2014 | Adams | F03D 7/0224 416/1 |
| 2014/0112777 A1* | 4/2014 | Kalra | F03D 7/048 416/1 |

FOREIGN PATENT DOCUMENTS

| | | |
|---|---|---|
| JP | 2001-349775 | 12/2011 |
| KR | 1020060128908 | 12/2006 |
| KR | 1020110052285 | 5/2011 |
| KR | 1020110137411 | 12/2011 |
| WO | 2012125842 A2 | 9/2012 |

OTHER PUBLICATIONS

Extended European Search Report dated Jun. 30, 2015 in corresponding European patent application No. 14179310.9-1607.

* cited by examiner

C1

C2

C3

B1

B2

B3

A1

A2

A3 wind

B1

A1

A1

A2

C1

B'1

B1

A'1

A1

Wind

A1    A1'    A2    A2'    A3

Eddy measuring step

Normal mode/control mode determining step

Unit controlling step

WIND POWER GENERATION UNIT, WIND FARM, AND ARRANGEMENT STRUCTURE AND CONTROL METHOD OF THE SAME

CROSS-REFERENCE TO RELATED APPLICATIONS

This application claims priority to Korean Application No. 10-2014-0019747, filed Feb. 20, 2014, the contents of which are incorporated herein in their entirety.

BACKGROUND

The present disclosure relates to a wind power generation unit, a wind farm which improves the degree of agglomeration, and arrangement structure and control method of the same, and more particularly, to a wind power generation unit, a wind farm, and arrangement structure and control method of the same, which facilitate arrangement of more wind power generation units in the same area by minimizing vortex interaction between the wind power generation units.

In wind power generation, a power generation facility converts kinetic energy of wind into a rotational energy of blades and produces electricity by operating an electric generator inside a nacelle.

Referring to FIG. 1, a wind farm includes a plurality of wind power generation units which rotate in the clockwise direction and are arranged at sufficient distances from each other in order to avoid a mutual interference. Therefore, a task in creating the wind farm including dozens or hundreds of wind power generation units is to secure enough land to arrange the wind power generation units at the sufficient distances from each other.

It can be considered to narrow the distance between the wind power generation units in order to increase power capacity per land unit, but it may cause a vibration of the blades due to vortex interaction generated by rotation of the blades of each wind power generation unit. Because the lifespan of the wind power generator is reduced due to such a vibration, in reality, there is a limitation in narrowing the distance between the wind power generation units.

In more detail, between the wind power generation units neighboring in a longitudinal direction as shown in FIG. 2, a rear vortex moves in the opposite direction to the rotational direction of the blades while wind passing the blades collides with the blades. That is, in the case of A1 of FIG. 2, while the blades rotate in the clockwise direction, rear vortex is generated in the counterclockwise direction and is transferred to B2.

FIG. 3 illustrates an influence of the rear vortex more concretely. As shown in FIG. 3, the wind power generation units of A1, B1 and C1 are all arranged in the longitudinal direction and all rotate in the clockwise direction. In this instance, all of the wind power generation units generate the rear vortex in the counterclockwise direction, and the rear vortex are overlapped and gradually amplified from A1 toward B1 and C1. As described above, in the conventional wind farm, the wind power generation units are arranged in the longitudinal direction at a sufficient distance from each other to avoid such an influence of the rear vortex in the longitudinal direction.

Meanwhile, between wind power generation units which are adjacent to one another in a transversal direction, a vortex is generated by centrifugal force generated by rotation of blade tips of each wind power generation unit. That is, in FIG. 2, a vortex directing downward is generated at the right side of A1 but a vortex directing upward is generated at the left side of A2. Therefore, mutual collision of the vortexes causes a vibration of the blades.

In more detail, conventionally, in case that a plurality of wind power generation units are installed, a vertical interval which is about seven times the rotor diameter must be maintained in order to minimize an efficiency drop of the wind power generation units installed at the rear by a slipstream flow generated by the wind power generation units installed at the front, and a transversal interval which is about three times the rotor diameter must be maintained in order to minimize an efficiency drop of wind power generation units by a vortex interaction generated by the wind power generation units installed laterally, and hence, there is a limitation in increasing the degree of agglomeration of the wind power generation units.

SUMMARY

Accordingly, the present disclosure has been made to address the above-mentioned problems, and it is an object of the present disclosure to provide a wind farm which improves the degree of agglomeration, and arrangement structure and control method of the same which enhance land availability by increasing the number of wind power generation units installed per unit area and extend the lifespan of the wind power generation units by reducing an influence by mutual interaction between vortexes.

In an embodiment, there is provided a wind farm including: at least two first-direction wind power generation units which are spaced apart from each other at a predetermined interval in order to avoid mutual vortex interaction and which are rotated in the same direction; and at least one second-direction wind power generation which is located between the neighboring first-direction wind power generation units and rotates in the opposite direction to a rotational direction of the first-direction wind power generation units, wherein the first-direction wind power generation unit and the second-direction wind power generation unit are installed adjacent to each other and respectively have blades rotating in the opposite direction to each other so as to mutually reduce an influence of vortexes generated from the blades.

In another aspect of the present disclosure, a control method of a wind farm includes the steps of: rotating at least two first-direction wind power generation units, which are spaced apart from each other at a predetermined interval in order to avoid mutual vortex interaction, in the same direction; and rotating at least one second-direction wind power generation, which is located between the neighboring first-direction wind power generation units, in the opposite direction to the rotational direction of the first-direction wind power generation units, wherein the first-direction wind power generation unit and the second-direction wind power generation unit are installed adjacent to each other and respectively have blades rotating in the opposite direction to each other so as to mutually reduce an influence of longitudinal or transversal vortexes generated from the blades.

The control method of the wind farm may includes: a vortex measuring step for measuring strength and direction of the vortex by vortex sensors mounted on each of the wind power generation units; a normal mode/control mode determining step for determining as a control mode when the degree of the vortex is more than a predetermined value, determining as a normal mode when the degree of the vortex is less than the predetermined value, and controlling the rotational speed of the blades to be decelerated only when the wind power generation unit is in the control mode; and a unit controlling step for controlling the wind power generation unit based on the measured strength and direction of the vortex.

In a further aspect of the present disclosure, an arrangement structure of a wind farm may include: at least two first-direction wind power generation units which are rotated in the same direction are spaced apart from each other at a predetermined interval in order to avoid mutual vortex interaction; and at least one second-direction wind power generation which rotates in the opposite direction to a rotational direction of the first-direction wind power generation units is located between the neighboring first-direction wind power generation units, wherein the first-direction wind power generation unit and the second-direction wind power generation unit are installed adjacent to each other and respectively have blades rotating in the opposite direction to each other so as to mutually reduce an influence of vortexes generated from the blades.

In an arrangement structure of a wind farm according to an embodiment of the present disclosure, a plurality of the first-direction wind power generation units and a plurality of the second-direction wind power generation units which rotate in the opposite direction to the first-direction wind power generation units are arranged in multiple rows in the transversal direction. Additionally, the first-direction wind power generation units and the second-unit wind power generation unit which form a plurality of the rows are arranged by turns in the transversal direction in order to reduce the influence of the transversal vortexes, the wind power generation units of the odd rows are located diagonally at the rear of the wind power generation units of the even rows so as to avoid a direct influence of the longitudinal vortexes.

Embodiments of the present disclosure may facilitate a denser arrangement by reducing the influence of transversal and longitudinal vortexes between neighboring wind power generation units. Therefore, embodiments of the present disclosure can alleviate or solve the problem of life-shortening due to the vibration by the vortexes and enhance land availability.

Moreover, embodiments of the disclosure may sense the degree of a vortex when the vortex is generated unavoidably in spite of the reduction of the influence of the vortex and prevent life-shortening by an excessive vibration by additionally controlling the vortex.

In more detail, when the rotational direction is opposed to the wind power generation unit installed at the front and pitch control is carried out in such a way as to be fit to a vector component of an inlet flow which is changed according to a transversal interval with the wind power generation unit installed at the front, the embodiments of the present disclosure may reduce or minimize an efficiency drop due to a slipstream flow generated by the wind power generation unit installed at the front through the transversal interval which is less than about two to seven times the rotor diameter.

Furthermore, because the rotational direction is opposed to the wind power generation unit installed laterally and a range of a flow interaction changed according to the transversal interval from the wind power generation units installed laterally may be minimized using pitch control and yaw control, embodiments of the present disclosure may effectively use the rotational flow generated by the wind power generation units installed laterally and reduce or minimize an efficiency drop due to the flow interaction through the transversal interval which is less than about two to three times the rotor diameter, so as to increase or maximize an electrical output in the wind farm of a limited area.

In brief, in a wind farm in which a plurality of wind power generation units are installed in transversal rows, the flow interaction between the wind power generation units may be reduced or minimized through yaw control which controls a lateral angle of a rotor according to the selection of rotational directions of the blades, pitch control to control angles of the blades, and a change in wind direction, and the number of the wind power generation units installed in the limited area of the wind farm may be increased or maximized using the flow created by surrounding wind power generators without installing additional specific facilities or devices.

BRIEF DESCRIPTION OF THE DRAWINGS

The above and other objects, features and advantages of the present disclosure will be apparent from the following detailed description of embodiments of the present disclosure in conjunction with the accompanying drawings, in which:

FIGS. 15b to 15d are enlarged views showing A-1, B-1 and B-2 of FIG. 15a;

FIGS. 16b to 16e are enlarged views showing A-1, A'-1, A'-2 and B-1 of FIG. 16a;

DETAILED DESCRIPTION

Reference will be now made in detail to embodiments of the present disclosure with reference to the attached drawings.

Figure 6:
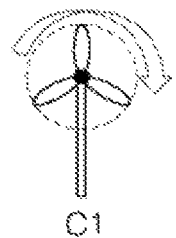
FIG. 6 is an arrangement diagram of wind power generation units arranged in a longitudinal direction in a wind farm according to an embodiment of the present disclosure.
Figure 6:
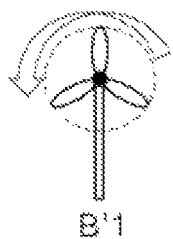
Figure 6:
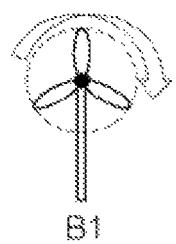
Figure 6:
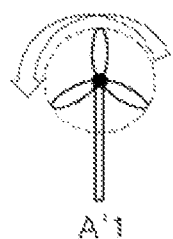
Figure 6:
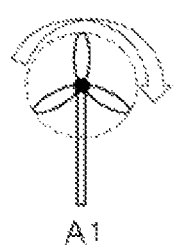
Figure 6:
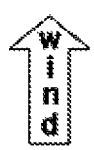

FIG. 6 illustrates arrangement structures of a wind farm according to an embodiment of the present disclosure. In the drawings, alphabet letters from A to C indicate columns and numbers from 1 to 3 indicate rows.

Superscripts of alphabet letters indicate wind power generation units which are adjacent to each other in a longitudinal direction and are operated in the opposite direction, and superscripts of numbers indicate wind power generation units which are adjacent to each other in a transversal direction and are operated in the opposite direction.

That is, based on A1, A'1 indicates a wind power generation unit which is adjacent in the longitudinal direction and rotates in the opposite direction, and A1' indicates a wind power generation unit which is adjacent in the transversal direction and rotates in the opposite direction. Meanwhile, A1' and A'1 rotate in the same direction because the opposite direction is repeated twice.

Embodiments of a wind farm according to the present disclosure may include at least two first-direction wind power generation units which are basically spaced apart from each other at a predetermined distance and rotate in the same direction.

Moreover, in order to enhance a space efficiency and reduce or minimize superposition and interaction of vortexes between the wind power generation units, a second-direction wind power generation unit which rotates in the opposite direction to the rotational direction of the first-direction wind power generation unit is arranged between the two first-direction wind power generation units which are adjacent to each other.

If a wind power generation unit which rotates in the same direction is additionally arranged, an excessive vibration may be generated due to superposition and interaction of vortexes so that the lifespan of the wind power generation unit may be remarkably reduced. However, in an embodiment of the present disclosure, because a wind power generation unit which rotates in the opposite direction is additionally arranged, embodiments of the present disclosure can enhance space availability and reduce life-shortening of the wind power generation unit caused by a vibration because superposition of vortexes is offset and interaction of the vortexes is reduced or minimized.

That is, the first-direction wind power generation units and the second-direction wind power generation units are adjacent to each other, and mutually reduce an influence of vortexes generated from their blades because the blades are rotated in opposite directions.

The second-direction wind power generation unit may be adjacent to the first-direction wind power generation unit in the longitudinal and/or transversal direction. Hereinafter, the arrangement structures of the first-direction wind power generation units and the second-direction wind power generation units will be described in more detail.

FIG. 6 shows a longitudinal arrangement relation. As shown in FIG. 6, the first-direction wind power generation units are spaced apart from each other at predetermined intervals in the longitudinal direction, and the second-direction wind power generation units are located between the first-direction wind power generation units which are arranged in the longitudinal direction. In FIG. 6, A'1 and B'1 which correspond to the second-direction wind power generation units are additionally arranged among A1, B1 and C1 which correspond to the first-direction wind power generation units.

As described above, spaces formed between the first-direction wind power generation units which are adjacent to each other can be utilized, and the influence of the longitudinal vortex between the neighboring wind power generation units can be reduced. According to circumstances, the interval between A1 and B1 may be widened to a certain extent in order to arrange A'1 between A1 and B1, and finally, the longitudinal interval between the wind power generation units becomes narrowed so that the space application is increased.

Referring to FIG. 7, a reduction of interaction of the longitudinal vortexes will be described.

Due to the law of action and reaction, in air flow at the rear of the blades of A1 rotating in the clockwise direction, a vortex of the counterclockwise direction is created. Such a vortex is transferred to A'1 located at the rear, and the blades of A'1 are rotates in the counterclockwise direction but, on the contrary, A'1 generates a vortex in the clockwise direction.

Therefore, the counterclockwise vortex generated by A1 and the clockwise vortex generated by A'1 are offset mutually, and hence, such vortexes do not have a great influence when they are transferred to B1.

Figure 3:
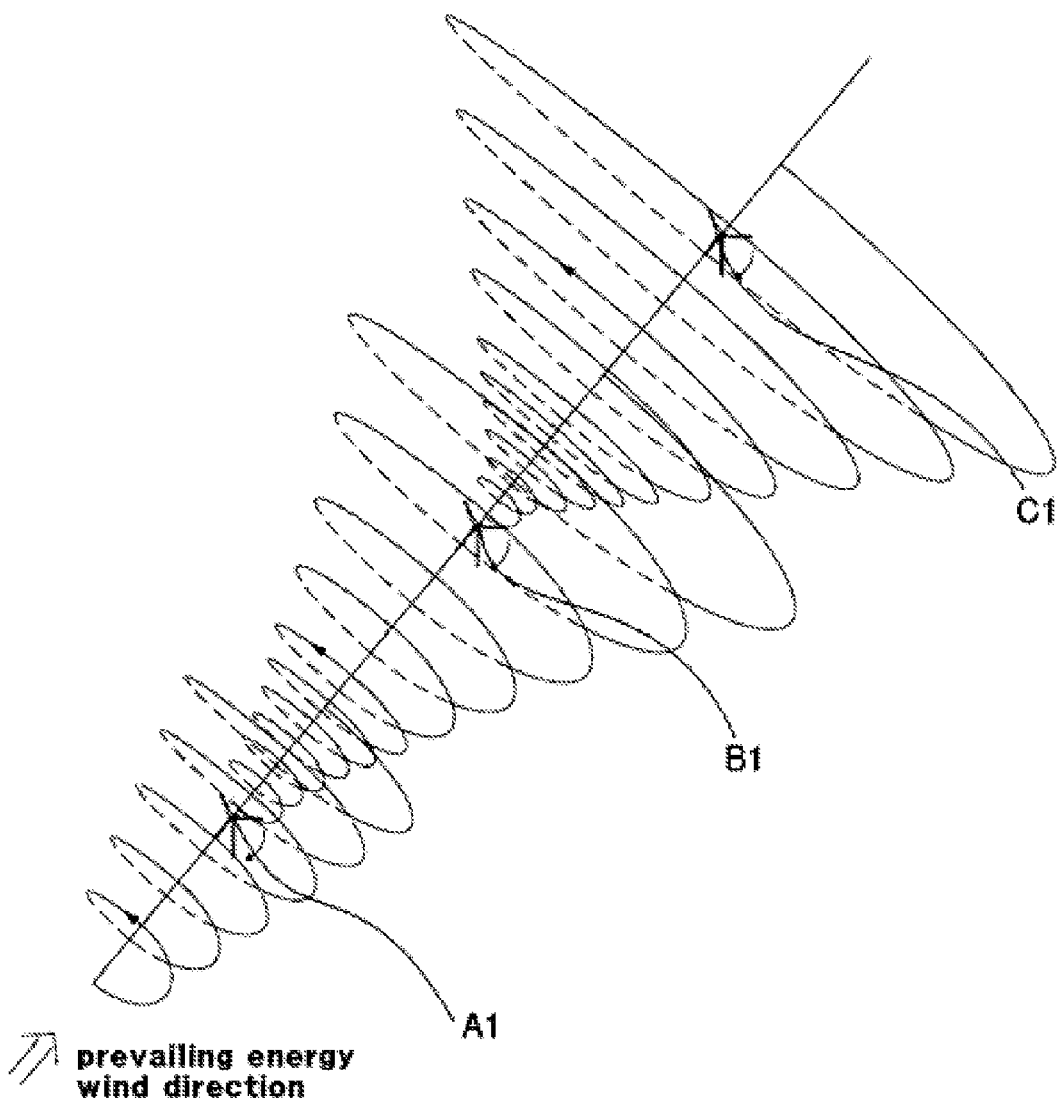
FIG. 3 is a conceptual diagram showing an influence of a longitudinal vortex of FIG. 2.
Figure 4:
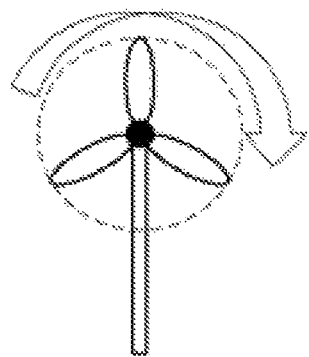
FIG. 4 is an epitomical diagram of wind power generation units neighboring in a transversal direction in a wind farm.
Figure 4:
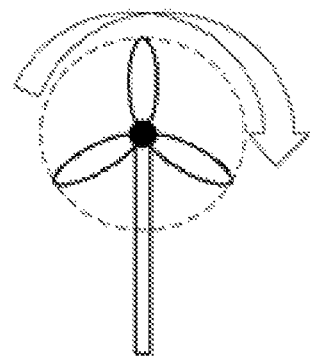
Figure 4:
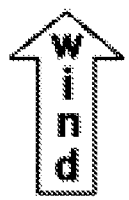

Referring to FIG. 3, the wind power generation units A1, B1 and C1 which are arranged in the longitudinal direction all rotate in the clockwise direction. In this instance, all of the wind power generation units which are arranged in the longitudinal direction generate rear vortexes in the counterclockwise direction, and the rear vortexes are gradually overlapped and amplified in the direction from A1 to C1. Therefore, because the influence of the vortexes is overlapped, this wind farm has a limitation in making the wind power generation units be adjacent to each other.

Embodiments of the present disclosure reduce or minimize this influence by the superposition of the vortexes and enhance density of the wind power generation units by arranging A'1 which rotates in the counterclockwise direction at the rear of A1 which rotates in the clockwise direction.

Figure 7A:
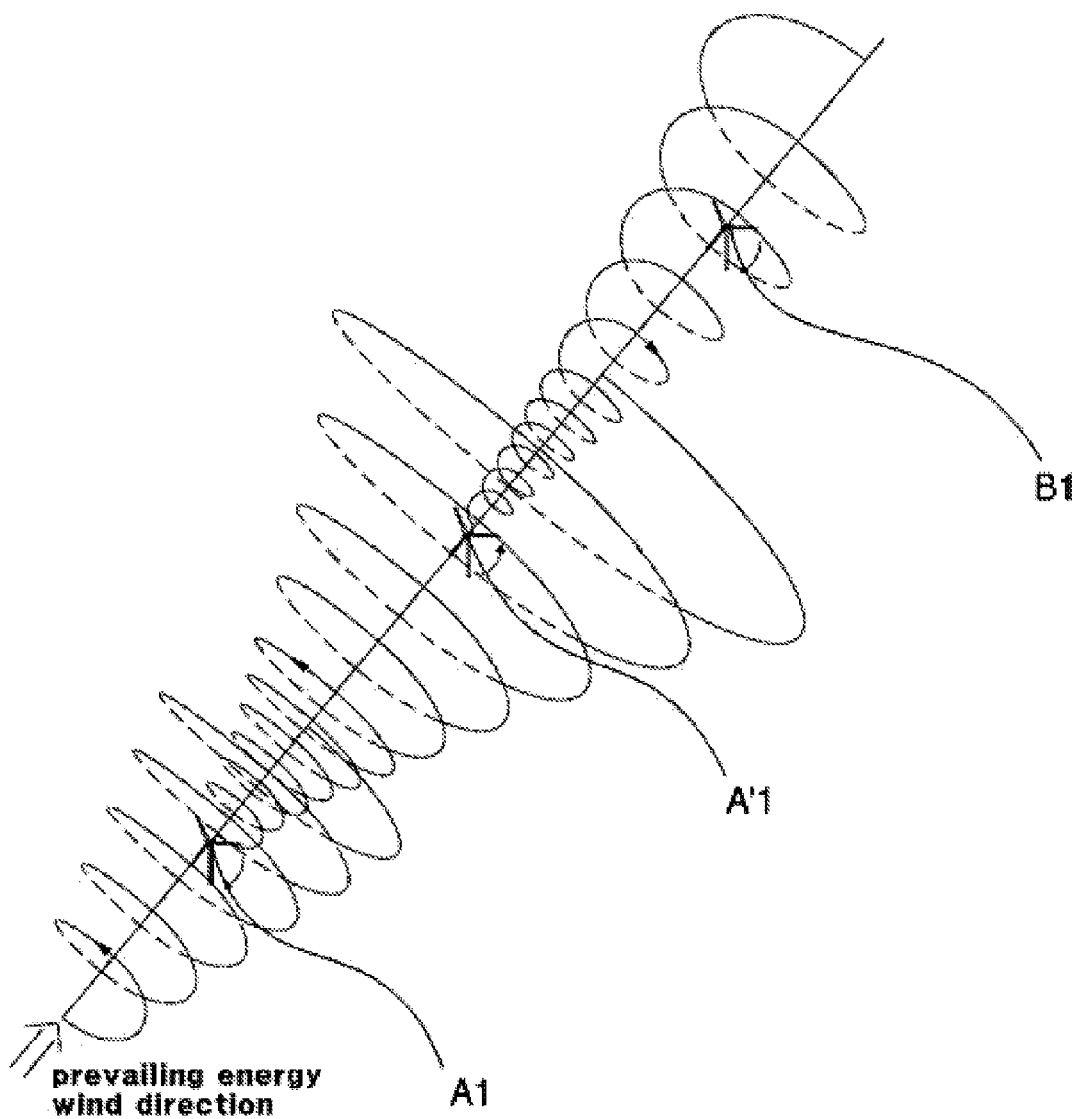
FIGS. 7a and 7b are conceptual diagrams showing the degrees of superposition and interaction of longitudinal vortexes according to an embodiment of the present disclosure.
Figure 7B:
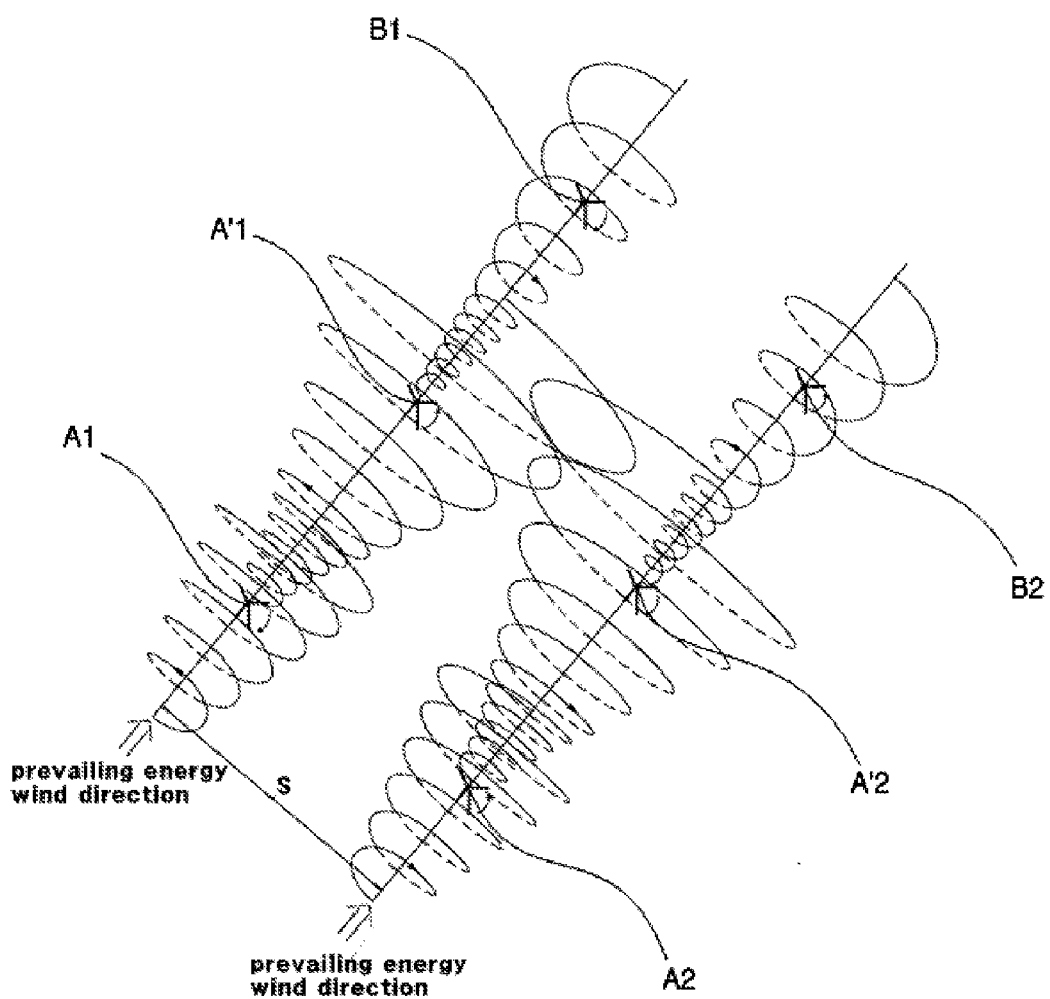

FIG. 7b illustrates a transversal expansion of the arrangement of the wind power generation units which are arranged in the longitudinal direction. In FIG. 7b, in case of the first and second rows of the wind power generation units, superposition of vortexes is offset in the longitudinal direction as described above, and in case of B1 and B2, the influence of transversal vortexes is also reduced due to the offset of the superposition of the longitudinal vortexes.

However, in case of A'1 and A'2, because the wind power generation units which are arranged in the transversal direction rotate in the same direction, there is a problem of interaction of the transversal vortexes. In B1 and B2, interaction of the transversal vortexes is also reduced, but some of them exist. Therefore, hereinafter, a transversal arrangement structure to solve such a problem will be described.

Figure 8A:
FIG. 8a shows a transversal arrangement of wind power generation units.
Figure 8A:
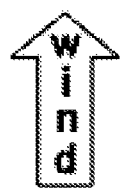
Figure 8B:
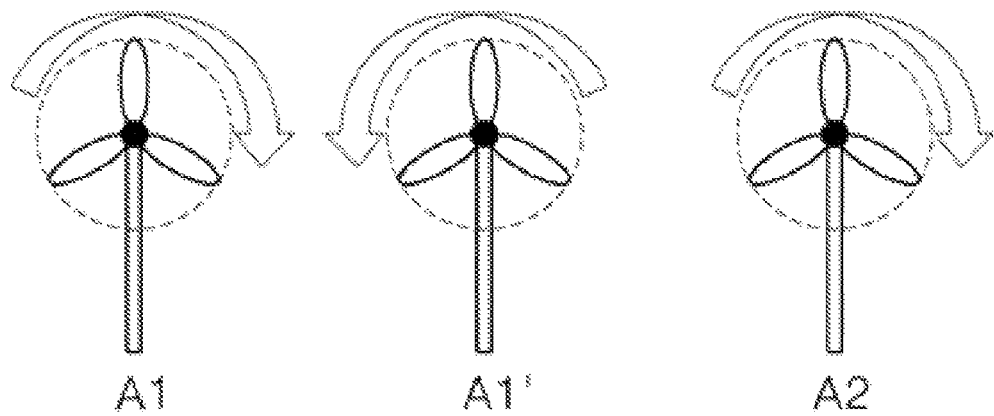
FIGS. 8b and 8c show a transversal arrangement of the wind power generation units installed in the transversal direction in the wind farm according to an embodiment of the present disclosure.
Figure 8B:
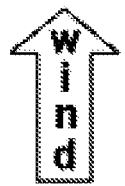
Figure 8C:
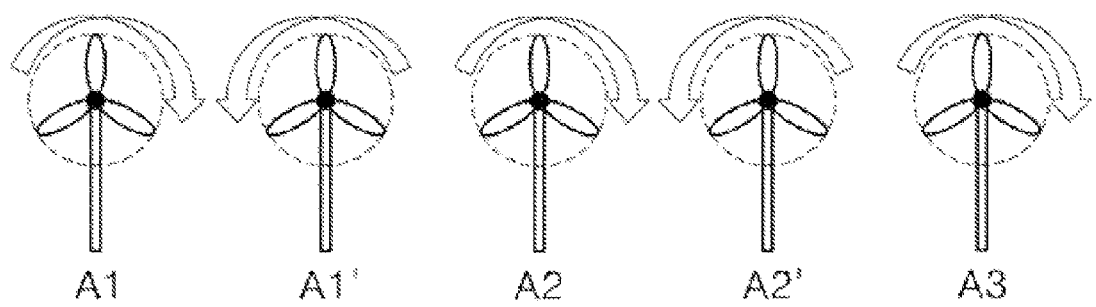
Figure 8C:

FIGS. 8b and 8c illustrate an arrangement of the second-direction wind power generation units and the first-direction wind power generation units which are arranged adjacent to each other in the transversal direction.

As shown in FIG. 8b, the first-direction wind power generation units are installed at a predetermined interval from each other in the transversal direction. Moreover, the second-direction wind power generation units are located at a central point between the wind power generation units which are arranged in the transversal direction.

In FIG. 8b, the first-direction wind power generation units correspond to A1 and A2 and the second-direction wind power generation unit A1' is installed between A1 and A2 as compared to FIG. 8a. As described above, spaces formed between the first-direction wind power generation units which are adjacent to each other can be utilized, and the influence of the transversal vortex between the neighboring wind power generation units can be reduced. According to circumstances, the interval between A1 and A2 may be widened to a certain extent in order to arrange A'1, and finally, the interval between the wind power generation units becomes narrowed so that the space application is increased.

In an aspect of reduction of vortex interaction, embodiments the present disclosure will be described. In FIG. 8b, it is expected that vortexes formed by the inertia generated from tips of the blades of A1 and A1' face vertically downward in the same direction in the space between A1 and A1'. The reason is that A1 and A1' rotate in the opposite direction to each other.

In contrast, wind power generation units that are all rotated in a same direction generate vortexes in the opposite direction between the neighboring wind power generation units. Hence, as shown in FIG. 1, there is a limitation in density of the wind power generation units because the wind power generation units must be spaced apart from each other at the predetermined interval.

FIG. 8c illustrates expansion of the arrangement of FIG. 8b. As shown in FIG. 8c, it may be considered that at least one first-direction wind power generation unit and at least one second-direction wind power generation unit are installed in the transversal direction alternatingly. The first-direction wind power generation units A1, A2 and A3 are arranged in the transversal direction, the second-direction wind power generation unit A1' is arranged between the first-direction wind power generation units A1 and A2, and the second-direction wind power generation unit A2' is arranged between the second-direction wind power generation units A2 and A3.

Here, A1, A2 and A3 indicate some of the first-direction wind power generation units conceptually but may be expanded to A4, A5, . . . in the transversal direction. In like manner, A1' and A2' indicate some of the second-direction wind power generation units conceptually but may be expanded to A3', A4', . . . .

Figure 1:
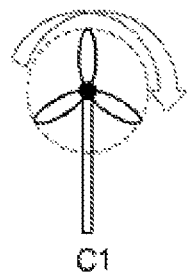
FIG. 1 is an arrangement diagram of a wind farm.
Figure 1:
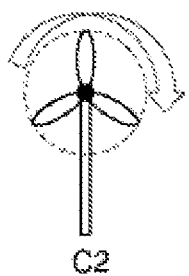
Figure 1:
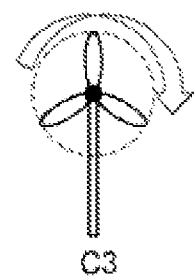
Figure 1:
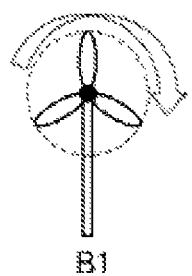
Figure 1:
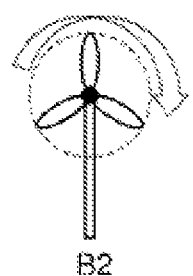
Figure 1:
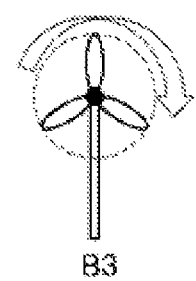
Figure 1:
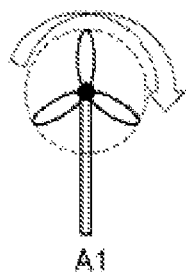
Figure 1:
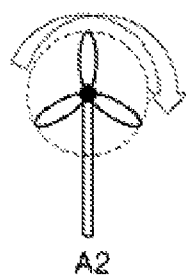
Figure 1:
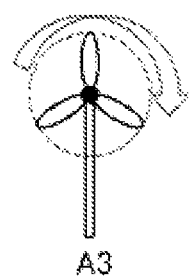
Figure 1:
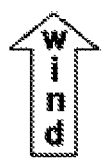
Figure 2:
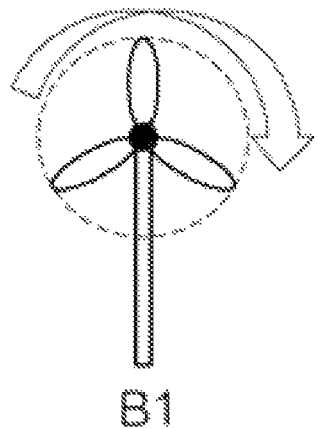
FIG. 2 is an epitomical diagram of wind power generation units neighboring in a longitudinal direction in a wind farm.
Figure 2:
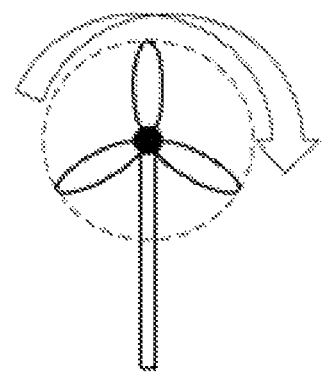
Figure 2:
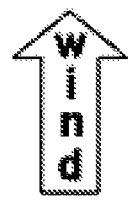

Meanwhile, the intervals among A1, A2 and A3 may be wider than the transversal intervals of FIG. 1, which does not include the second-direction wind power generation units, but the transversal intervals between A1 and A'1, between A'1 and A2, between A2 and A2', and between A'2 and A3 are narrower than the intervals of FIG. 1.

Figure 9:
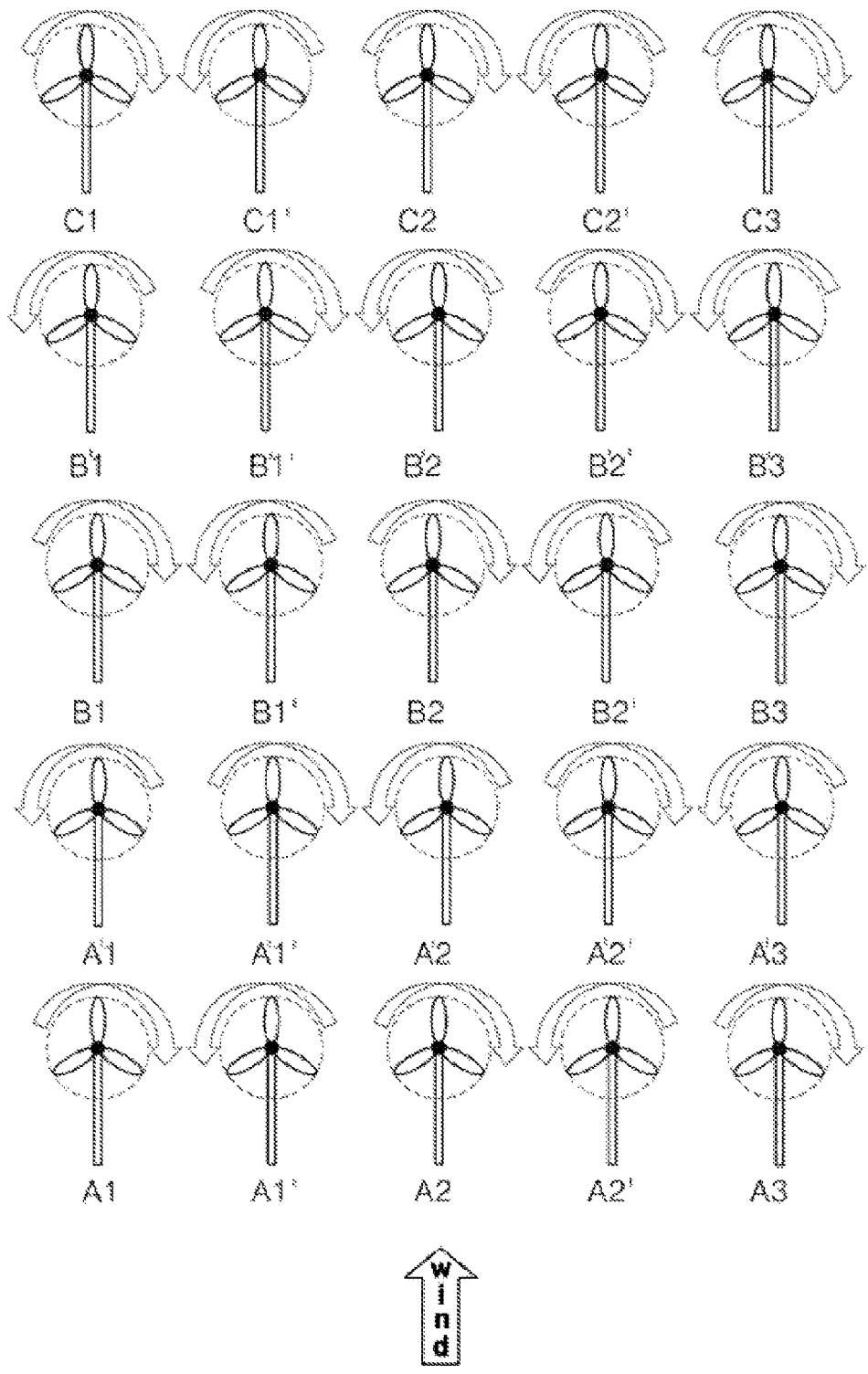
FIG. 9 is an arrangement diagram showing transversal and longitudinal arrangement of the wind power generation units according to an embodiment of the present disclosure.

FIG. 9 shows that the transversal arrangement of FIG. 6 is formed in many rows and synthetically shows the longitudinal arrangement of FIG. 6 and the transversal arrangement of FIG. 8.

In other words, in FIG. 8, the wind power generation units are arranged in such a way as to be rotated in the opposite directions to the wind power generation units which are located at the front, rear, left and right sides based on the corresponding wind power generation unit, so as to simultaneously reduce interaction of the transversal and longitudinal vortexes.

That is, B'2 which is located at the center is rotated in the opposite directions to the rotational directions of B2 which is located at the front, C2 which is located at the rear, B'1' which is located at the left, and B'2' which is located at the right, and such a rotation is commonly applicable to all of the wind power generation units shown in FIG. 9.

Figure 10A:
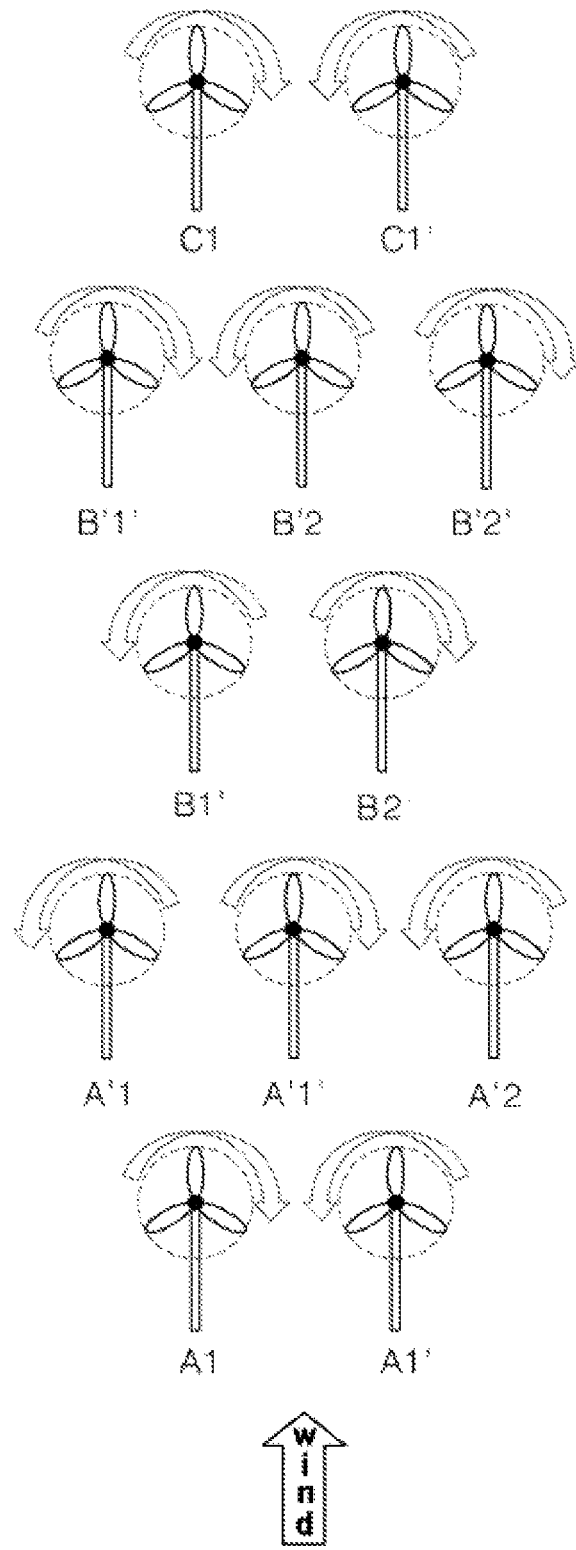
FIG. 10a is an arrangement diagram showing a zigzag arrangement of the wind power generation units according to an embodiment of the present disclosure.

Meanwhile, FIG. 10a illustrates an arrangement structure of a wind farm according to an embodiment of the present disclosure.

In FIG. 10a, a plurality of the first-direction wind power generation units and a plurality of the second-direction wind power generation units which rotate in the opposite direction to the first-direction wind power generation units are arranged in multiple rows in the transversal direction.

That is, there are a row of A including A1 and A1', a row of B including B1 and B1', and a row of C including C1 and C1'.

Moreover, the first-direction wind power generation units and the second-unit wind power generation unit which form a plurality of the rows are arranged alternatingly in the transversal direction in order to reduce the influence of the transversal vortexes. Such an arrangement is the same as that of FIG. 9.

Compared with FIG. 9, in FIG. 10a, the wind power generation units of the odd rows are located diagonally at the rear of the wind power generation units of the even rows so as to avoid a direct influence of the longitudinal vortexes. That is, the row of A' is located next to the row of A, and the wind power generation units in the rows of A and A' are arranged diagonally to each other so as to avoid the influence of the longitudinal vortexes. Additionally, the row of B is arranged at the rear of the row of A', and the wind power generation units of the rows of A' and B are arranged diagonally to each other so as to avoid the influence of the longitudinal vortexes.

In the meantime, the rows of A and B are odd rows, and the rows of A' and B' are even rows.

In other words, the wind power generation units of the odd rows are located between the even rows, and the first-direction wind power generation units and the second-direction wind power generation units are arranged by turns in such a manner that the wind power generation units arranged in the same column of the odd rows are rotated in the opposite direction to each other in order.

In the meantime, the neighboring wind power generation units which are located in the same column of the odd row, like A1 and B1', are rotated in the opposite direction to each other so as to additionally reduce the influence of the longitudinal vortexes mutually.

On the contrary, like the rows of A' and B', the wind power generation units of the even row are located between the wind power generation units of the even row. Moreover, the first-direction wind power generation units and the second-direction wind power generation units are arranged alternatingly in such a manner that the wind power generation units arranged in the same column of the even rows are rotated in the opposite direction to each other in order.

Here, the neighboring wind power generation units which are located in the same column of the odd row, like A'1 and B'1', are rotated in the opposite direction to each other so as to additionally reduce the influence of the longitudinal vortexes mutually.

Figure 10B:
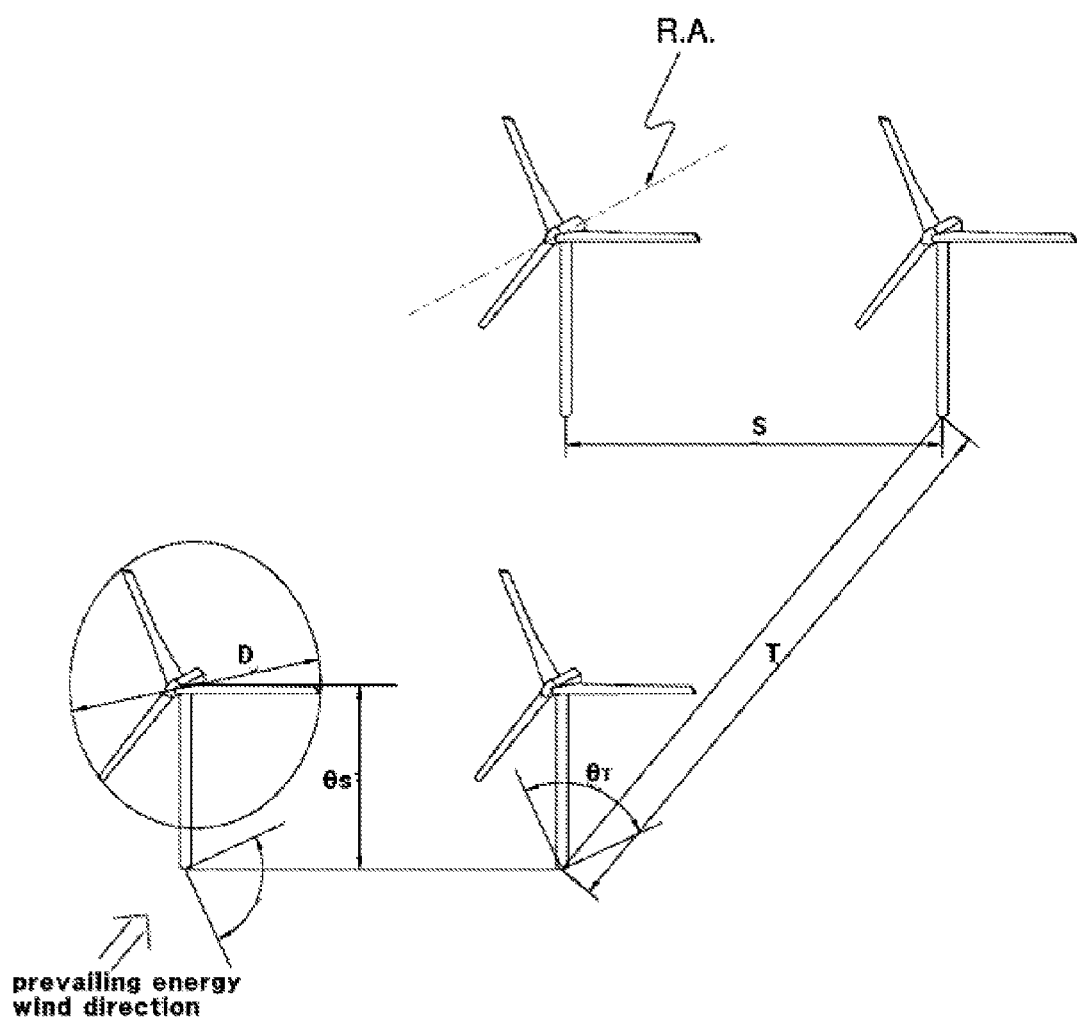
FIG. 10b is a conceptual diagram showing a longitudinal arrangement angle and a transversal arrangement angle of the wind power generation units in a wind farm according to an embodiment of the present disclosure.

Meanwhile, FIG. 10b shows a longitudinal arrangement angle and a transversal arrangement angle of the wind power generation units in the wind farm according to an embodiment of the present disclosure.

In FIG. 10b, R.A. means a rotation axis of each wind power generation unit, namely, arrangement angles of the transversal wind power generation units and the longitudinal wind power generation units based on a line that projects the rotation axis on a plane or based on the prevailing energy wind direction.

θs indicates an arrangement angle of the wind power generation units which are arranged in the transversal direction, and θt indicates an arrangement angle of the wind power generation units which are arranged in the longitudinal direction. It is preferable that the θs be within a range of −45° to 45° based on the vertical direction of the prevailing energy wind direction, and that the θt be within a range of −45° to 45° based on the prevailing energy wind direction.

Figure 11:
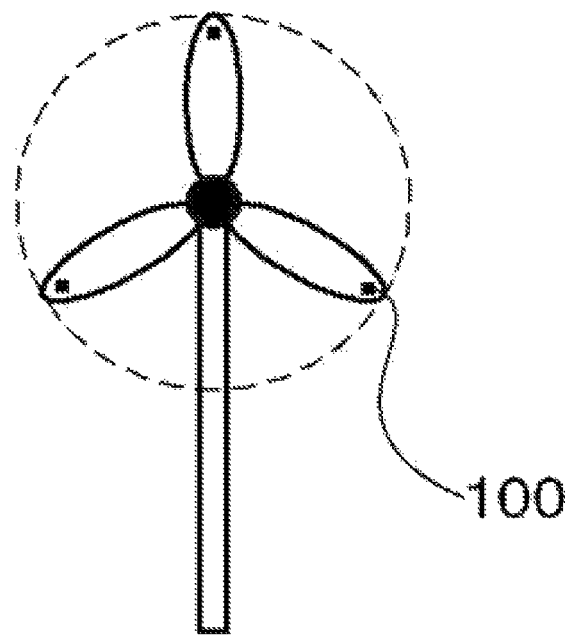
FIG. 11 shows a wind power generation unit having a sensor.

FIG. 11 shows a vortex sensor or a vibration sensor which is mounted at tips of the blades of the wind power generation unit according to an embodiment of the present disclosure. The sensor may be mounted at one of various positions, such as a front central portion of a hub, a central portion of the blade, and an upper portion of a tower, but it is preferable that the sensor be mounted at the tip of the blade as designated by the reference numeral 100 in FIG. 11.

The vortex sensor senses strength and direction of the vortex by measuring scattering of wind and the scattered degree of wind incident onto the wind power generation unit.

Meanwhile, the vibration sensor measures movements of the blades except the normal rotation of the blades, using the principle of an accelerometer.

Figure 12:
FIGS. 12 to 14 are flow charts showing a control method of the wind farm according to an embodiment of the present disclosure.
Figure 12:

FIG. 12 shows a control method of the wind farm based on detection of vortexes.

In FIG. 12, it is an object of the present disclosure to provide a control method for the wind farm which can protect the wind power generation units by additionally controlling an influence of the vortex which may be additionally generated in the arrangement of the wind farm illustrated in FIGS. 6 to 10a.

As shown in FIG. 12, the control method of the wind farm includes i) a vortex measuring step, ii) a normal mode/control mode determining step, and iii) an unit controlling step.

First, the vortex measuring step is to measure strength and direction of the vortex by the vortex sensor mounted on each of the wind power generation units.

Moreover, the unit controlling step is to protect each unit from an excessive vibration due to the influence of the vortex by a deceleration control of the wind power generation unit based on the measured strength and direction of the vortex.

Furthermore, it is preferable that the control method further include the normal mode/control mode determining step between the vortex measuring step and the unit controlling step.

In relation with the normal mode and the control mode, if the degree of the vortex is more than a predetermined value, it is determined as the control mode, and if the degree of the vortex is less than the predetermined value, it is determined as the normal mode, and it is preferable that the rotational speed of the blades be controlled to be decelerated only when the wind power generation unit is in the control mode. Therefore, in order to enhance control efficiency, the unit controlling step neglects the influence of the vortex which is less than the predetermined value but is operated only when the vortex which is more than the predetermined value is generated.

In the meantime, for the deceleration control in the unit controlling step, various deceleration means, such as i) blade pitch control, ii) a hub brake which is disposed between a hub and a nacelle frame for fixing them, iii) a shaft brake which is disposed between the hub and a generator for decelerating a shaft which transfers a rotational force of the blades to the generator, and iv) an inner generator brake which is disposed inside the generator for decelerating a rotational speed of a generator rotor, may be considered.

Such deceleration is to protect the wind power generation units in safety from the influence of the vortex which is generated in spite of the arrangement of the wind power generation units to reduce the influence of the vortex.

Figure 14:
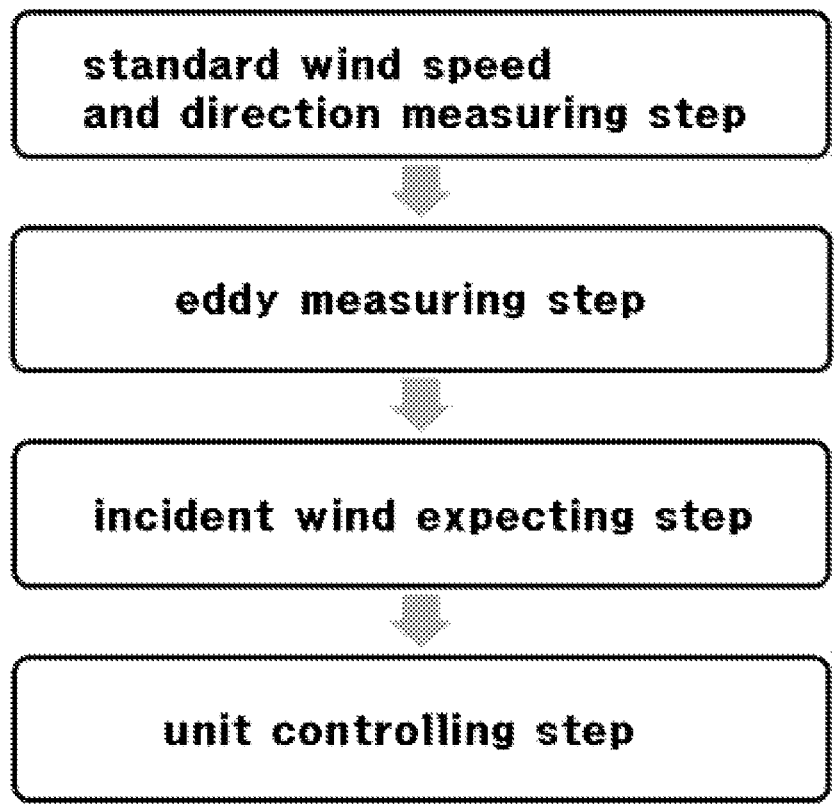

Meanwhile, in general consideration of strength and direction of vortex and strength and direction of wind blowing to the wind farm, in the vortex sensor, a control of pitch and/or yawing of each wind power generation unit may be also considered. Referring to FIG. 14, it will be described in more detail later.

Figure 13:
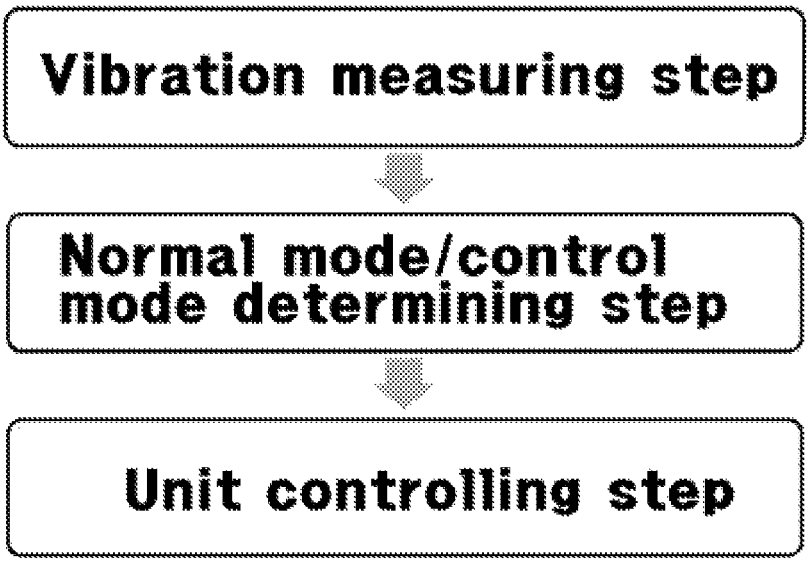

FIG. 13 shows a control method based on a vibration measurement.

As shown in FIG. 13, the control method includes i) a vibration measuring step, ii) a normal mode/control mode determining step, and iii) an unit controlling step.

First, the vibration measuring step is to measure strength and direction of the blades from the vibration sensor which measures vibration of the blades of the wind power generation units.

Moreover, the unit controlling step is to control the wind power generation units based on the measured strength and direction of vibration.

Furthermore, it is preferable that the control method further include the normal mode/control mode determining step between the vibration measuring step and the unit controlling step. In the normal mode/control mode determining step, if the degree of vibration is more than a predetermined value, it is determined as the control mode, and if the degree of vibration is less than the predetermined value, it is determined as the normal mode, and the rotational speed of the blades is controlled to be decelerated only when the wind power generation unit is in the control mode.

The control method based on the vortex illustrated in FIG. 12 is an indirect control method, but the control method based on vibration illustrated in FIG. 13 is a direct control method.

FIG. 14 shows a control method based on expectation of an incident wind.

As shown in FIG. 14, the control method based on expectation of the incident wind includes i) a wind speed and direction measuring step, ii) a vortex measuring step, iii) an incident wind expecting step, and iv) a unit controlling step.

First, the standard wind speed and direction measuring step is to measure average wind speed and direction around the wind farm. Here, the average wind speed and direction may be an average wind speed of the entire wind farm, or may be average wind speed and direction defined by a certain area unit including the corresponding wind power generation unit to be controlled.

Next, the vortex measuring step is to measure strength and direction of the vortex by the vortex sensor mounted on each of the wind power generation units. A detailed description of the vortex measuring step will be omitted because it is described above.

Additionally, the incident wind expecting step is to expect an incident wind of each wind power generation unit by totaling up the wind speed and direction measured in the wind speed and direction measuring step and the strength and direction of the vortex as a vector value.

In addition, the control method includes the unit controlling step for controlling the wind power generation units based on the expected strength and direction of the incident wind. The unit controlling step controls yawing of the nacelle if there is a change in direction of the incident wind and controls a pitch of the blade if there is a change in speed of the incident wind.

In brief, the control method based on the incident wind includes the steps of: totaling up average speed and direction values of wind blowing toward the wind farm and the influence of the vortex of each wind power generation unit, expecting the incident wind of each wind power generation unit, and controlling the wind power generation unit according to the expected value.

Hereinafter, in the unit controlling step, a group control which facilitates a more effective control will be described.

The wind power generation units which are installed in the transversal direction form a group by rows. For instance, in FIG. 18, A1, A1', B1, B1', C1 and C1' form a group. In this instance, it is preferable to deduce an average value of values measured by the sensors mounted on the wind power generation units of the group and to control the group by rows on the basis of the average value.

Moreover, the wind power generation units which are installed in the longitudinal direction form a group by columns. For instance, in FIG. 18, A1, A1', B1, B1', C1 and C1' form a group. In this instance, an average value of values measured by the sensors mounted on the wind power generation units of the group may be deduced and the control may be performed by columns on the basis of the average value.

Meanwhile, additional groups may be also formed by odd rows and by even rows. In this case, an average value of the additional groups of the average value of each group is deduced, and then, the additional groups are controlled together based on the average value of the additional groups.

On the contrary, additional groups may be also formed by odd columns and by even columns. In this case, an average value of the additional groups of the average value of each group is deduced, and then, the additional groups are controlled together based on the average value of the additional groups.

Figure 18:
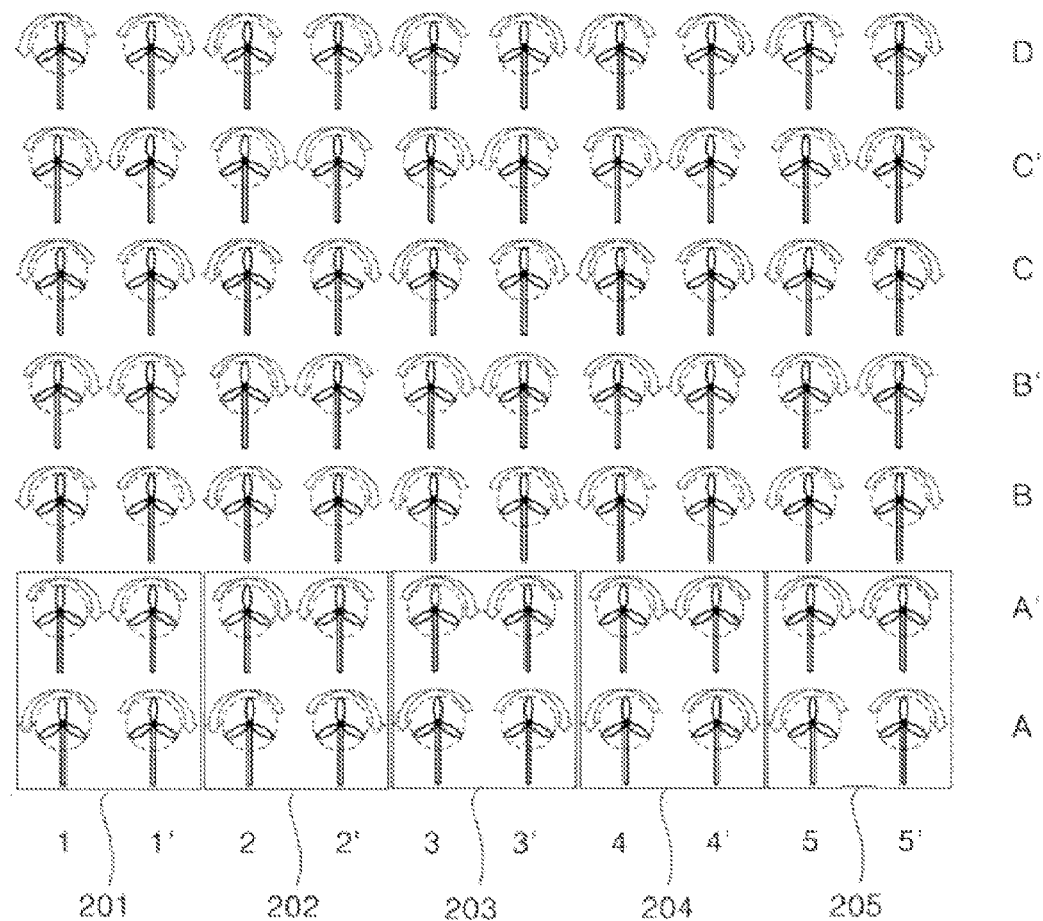
FIG. 18 is an arrangement diagram showing group control according to an embodiment of the present disclosure.

On the other hand, as shown in FIG. 18, the wind power generation units may form a group by a certain area. In this case, an average value of values measured by the sensors mounted on each wind power generation unit is deduced, and then, the groups by the certain area are controlled together based on the average value.

The group control can be applied to the control method based on vortex shown in FIG. 12, the control method based on vibration shown in FIG. 13, and the control method based on the expectation of the incident wind shown in FIG. 14.

In the meantime, referring to FIGS. 3, 5, 7a, 7b, 15 and 16 showing the influence of the vortex, embodiments of the present disclosure will be described.

First, referring to FIGS. 3 and 5, problems caused when the wind power generation units which have the same rotational direction are arranged in the longitudinal direction will be described.

The wind power generation unit which is installed in the first row in the prevailing energy wind direction does not have any strong slipstream flow because there is no wind power generation unit in front of the wind power generation units installed in the first row, but a weak forward flow of a spiral form is generated in a subsonic flow field in the opposite direction to the rotational direction of the wind power generation unit. Such a flow is converted into a strong spiral flow which rotates in the opposite direction to the rotational direction of the wind power generation unit while passing the wind power generation unit A1 which is installed in the first row, and the strong spiral flow becomes stronger while being introduced into the wind power generation unit B1 installed in the second row when the vertical interval between the wind power generation units is small. After that, the flow becomes still stronger in rotational force while passing the wind power generation unit B1 which is installed in the second row and rotates in the same direction, and then, is introduced into the wind power generation unit C1 which is installed in the third row.

As shown in FIG. 15, the strong spiral flow which reaches the blades of the wind power generation unit B1 installed in the second row and rotates in the opposite direction to the rotational direction of the blades increases a relative speed generated by the rotation of the blades because it includes a flow component which is vertical to a horizontal axis of the wind power generation unit, but a flow component which is parallel to the horizontal axis of the wind power generation unit is relatively decreased, such that an effective flow incident angle may be maintained only when an air foil pitch angle is adjusted to the rear of the wind power generation unit.

In case of the wind power generation unit C1 which is installed in the third row, such a phenomenon is growing more due to the spiral flow rotating in the opposite direction to the rotational direction of the wind power generation unit in which the rotational force becomes stronger while passing the wind power generation unit B1 which is installed in the second row.

Figure 15A:
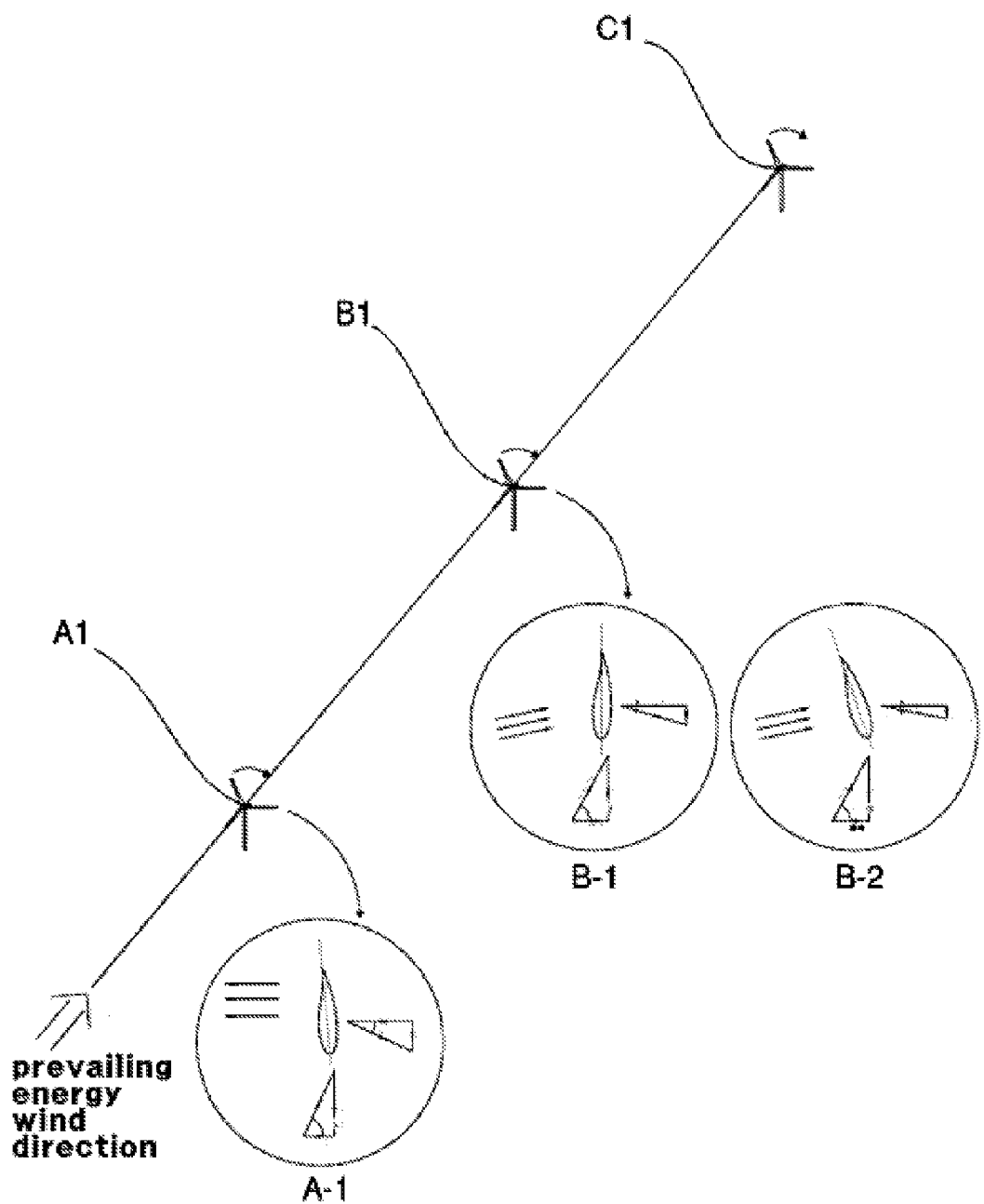
FIG. 15a is a conceptual diagram showing pitch control according to an embodiment of the present disclosure.
Figure 15B:
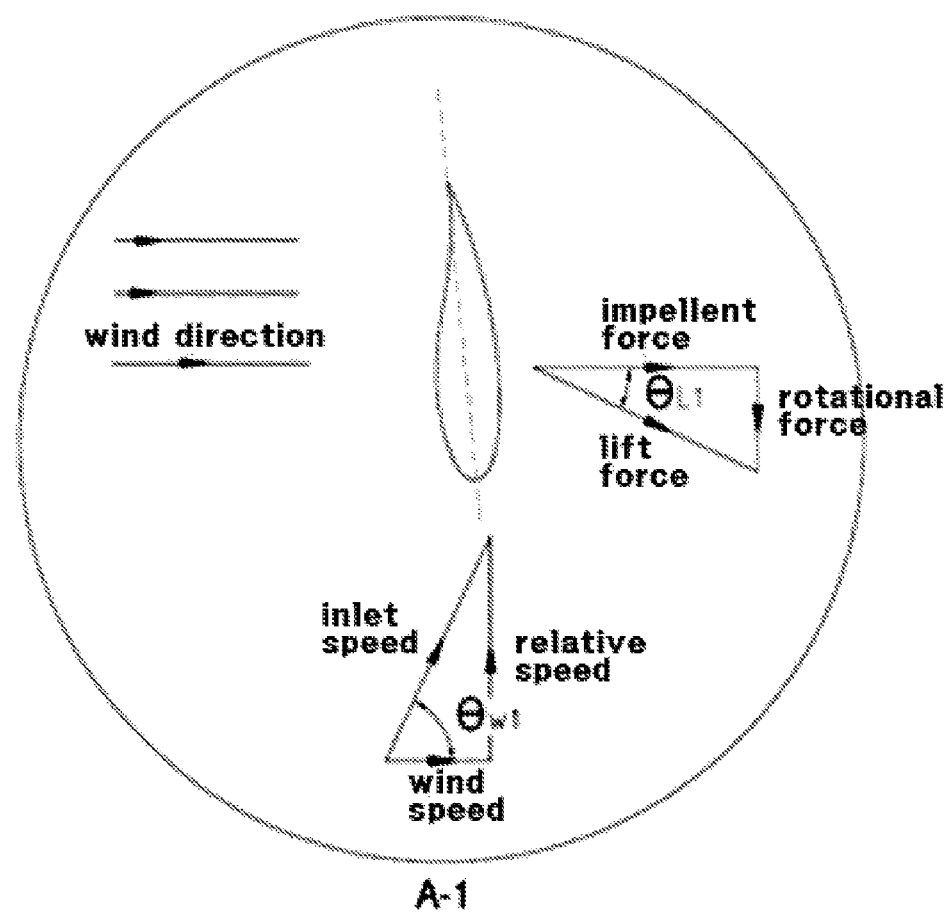
Figure 15C:
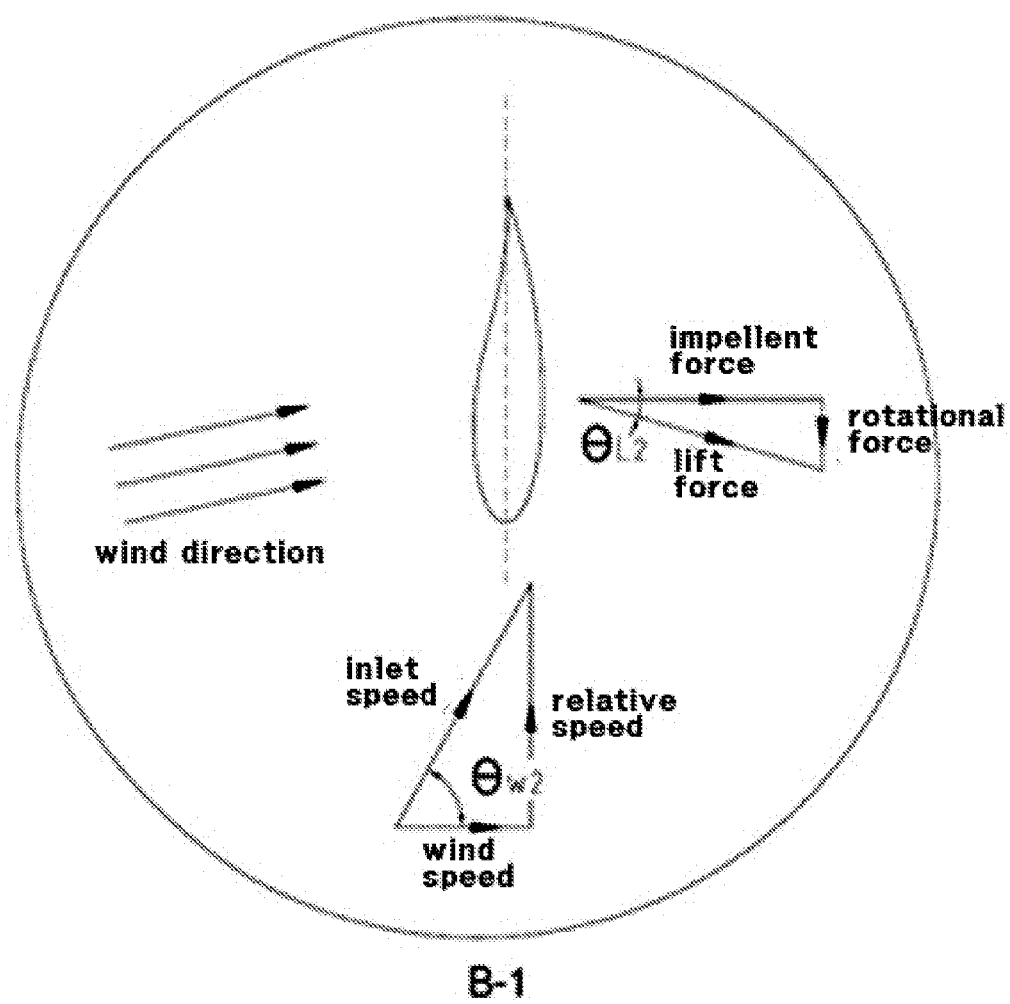
Figure 15D:
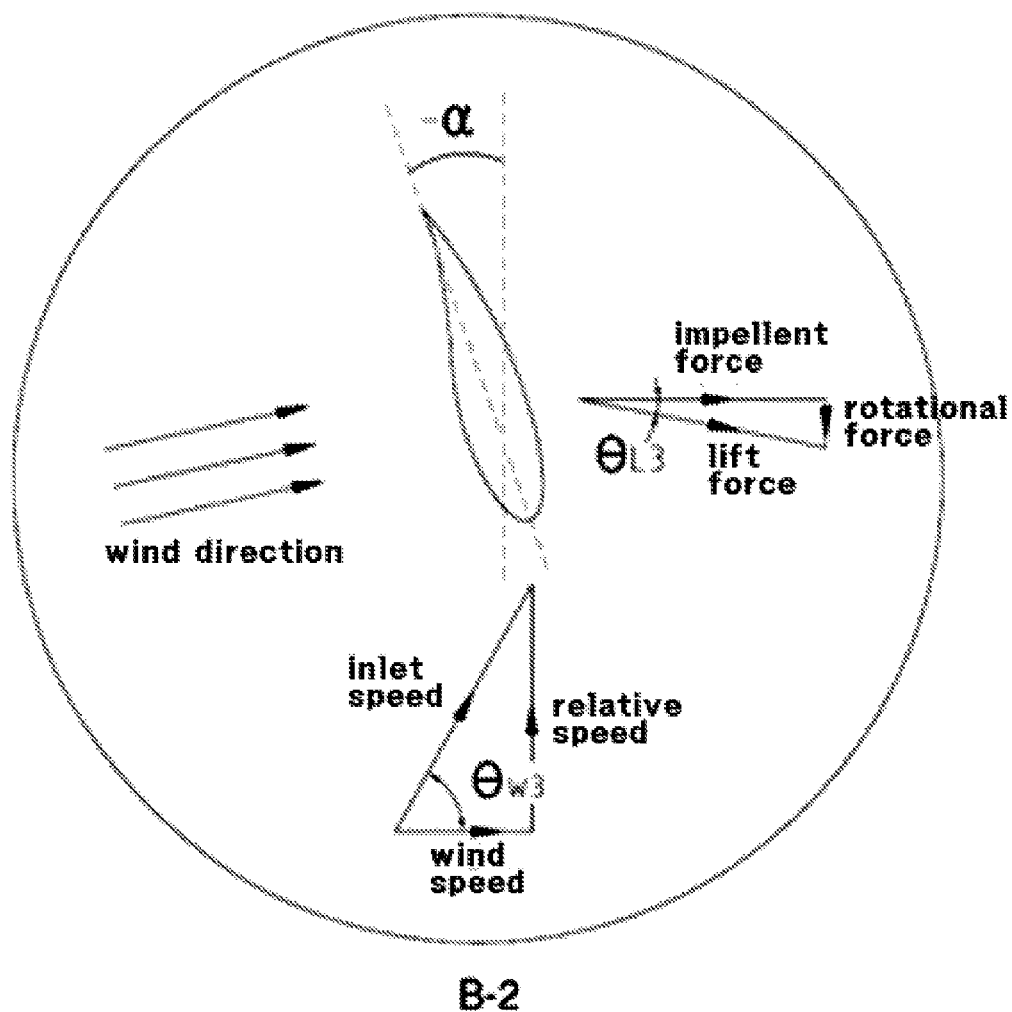

Therefore, as shown in FIG. 15c, in order to maintain the effective flow incident angle based on the blade section, a pitch angle must be adjusted to the rear of the wind power generation unit in such a manner that a pitch angle value becomes a negative number, namely, $-\alpha$, and then, a lift force of the blades works in the opposite direction, and finally, the blades are deteriorated in aerodynamic efficiency due to a reverse rotation of the rotational force which is generated in the opposite direction to the expected rotational direction and due to a reverse rotation of the airfoil blade section.

In order to prevent the reverse rotation, the existing flow incident angle is maintained even though the flow incident angle is ineffective, but in this instance, an aerodynamic vibration is caused due to the deterioration of aerodynamic efficiency and discordance between an incident angle of the optimum flow and an incident angle of the actual flow in the airfoil blade section.

FIGS. 7a and 7b show an arrangement structure of the wind power generation units which have different rotational directions in the longitudinal direction.

As shown in FIGS. 7a and 7b, the wind power generation unit A1 installed in the first row in the prevailing energy wind direction does not have any strong slipstream flow because there is no wind power generation unit in front of the wind power generation units installed in the first row, but a weak forward flow of a spiral form is generated in a subsonic flow field in the opposite direction to the rotational direction of the wind power generation units. Such a flow is converted into a strong spiral flow which rotates in the opposite direction to the rotational direction of the wind power generation unit while passing the wind power generation unit A1 which is installed in the first row, and the strong spiral flow becomes stronger while being introduced into the wind power generation unit A'1 installed in the second row when the vertical interval between the wind power generation units is small. After that, the rotational direction of the flow is changed into the opposite direction while passing the wind power generation unit A'1 which is installed in the second row and rotates in the opposite direction, and then, is introduced into the wind power generation unit B1 which is installed in the third row in a state where a rotational force of an outlet flow becomes weakened significantly by an influence of an inlet flow which is opposed in the rotational direction, namely, in a state where the flow component in the horizontal direction is recovered.

Figure 16A:
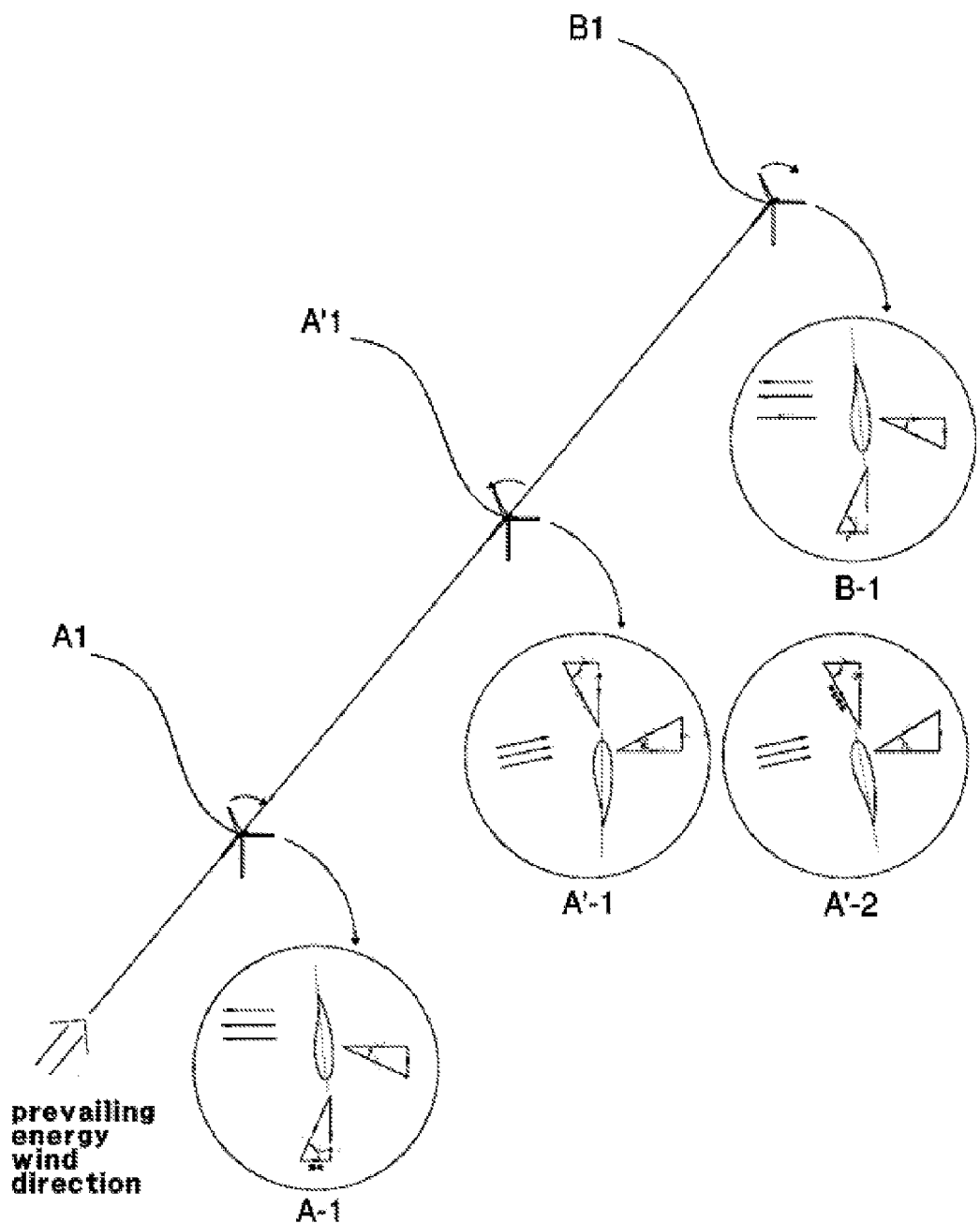
FIG. 16a is a conceptual diagram showing a longitudinal arrangement and a pitch control according to an embodiment of the present disclosure.
Figure 16B:
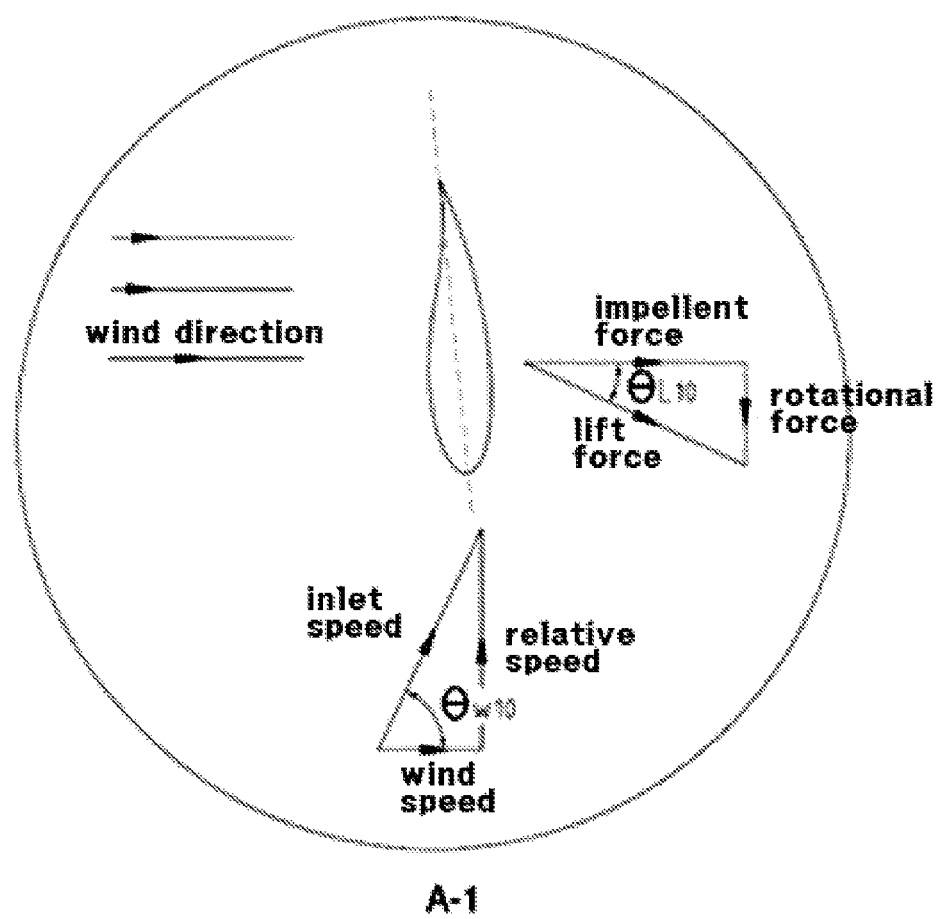
Figure 16C:
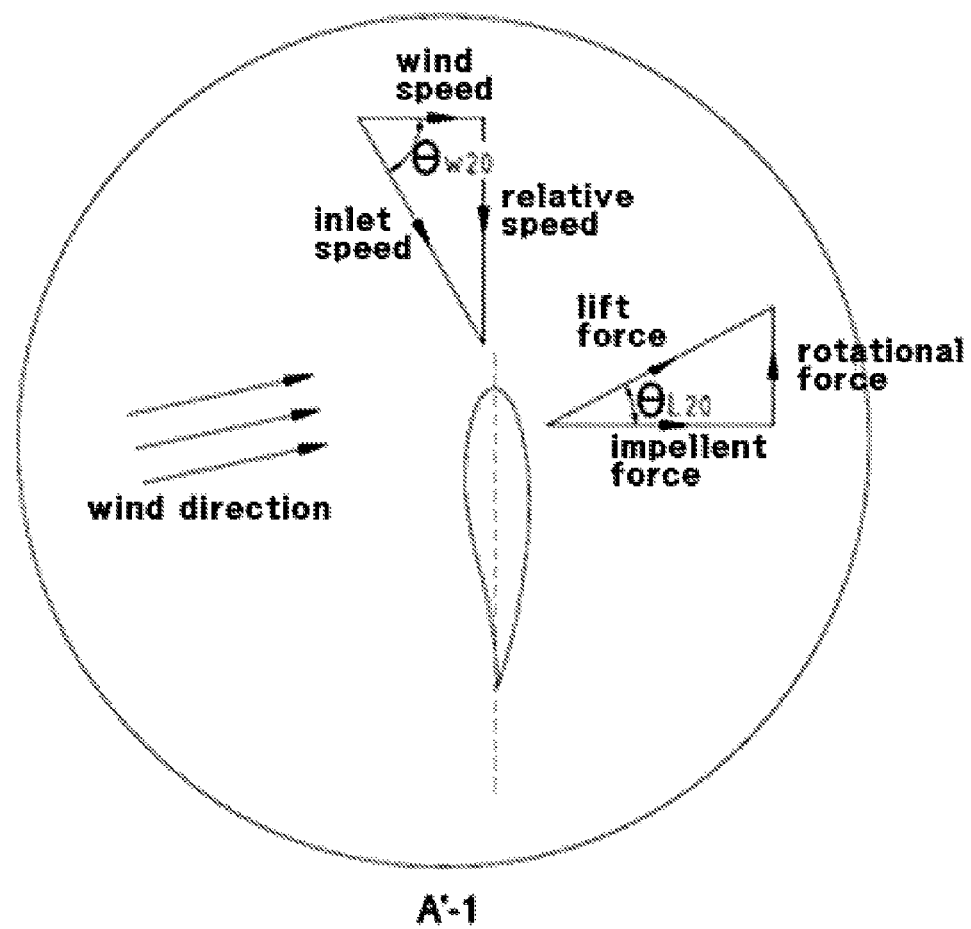
Figure 16D:
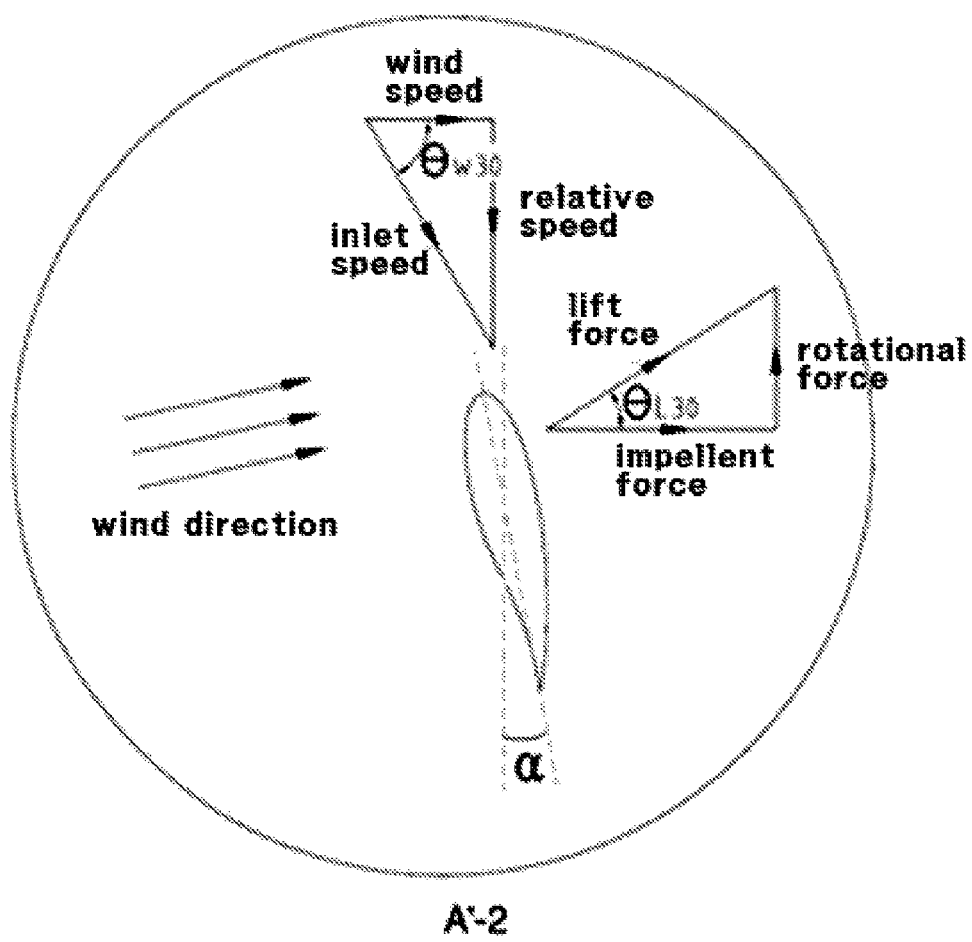
Figure 16E:
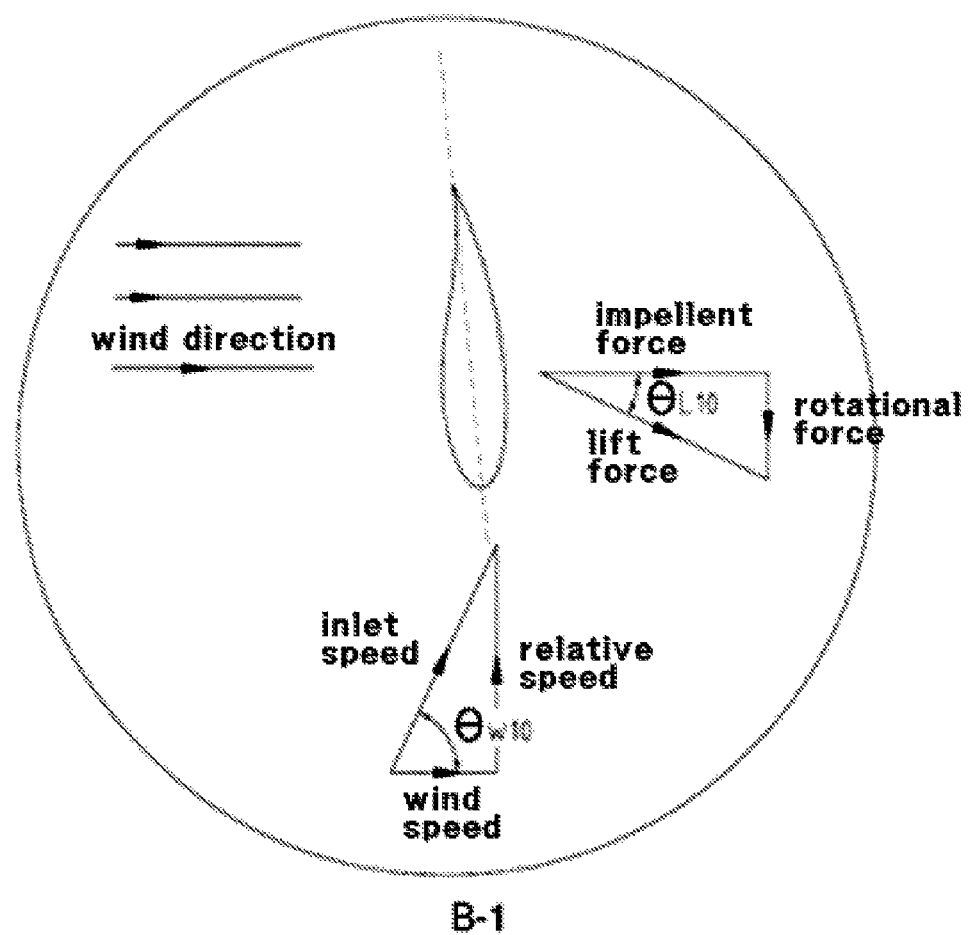
Figure 17:
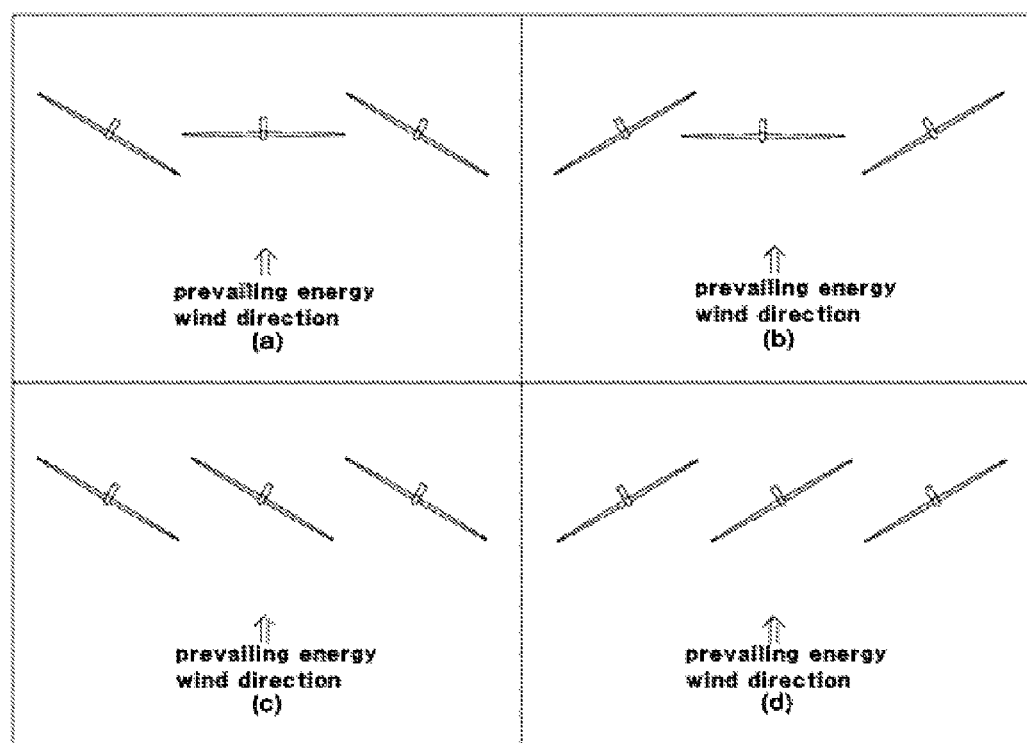
FIG. 17 is a conceptual diagram showing yaw control according to an embodiment of the present disclosure.

As shown in FIG. 16a, because the blades of the wind power generation unit A'1 which is installed in the second row are rotated in the opposite direction to the wind power generation unit installed in the front, the strong spiral flow which reaches the blades of the wind power generation unit A'1 installed in the second row and rotates in the same direction with the rotational direction of the blades decreases a relative speed generated by the rotation of the blades because the spiral flow contains a flow component which is vertical to a horizontal axis of the wind power generation unit, but a flow component which is parallel to the horizontal axis of the wind power generation unit is relatively decreased, such that an effective flow incident angle is maintained when an airfoil pitch angle is adjusted to the front of the wind power generation unit as shown in FIG. 16d.

In case of the wind power generation unit B1 which is installed in the third row, such a phenomenon becomes weaker due to the spiral flow rotating in the opposite direction to the rotational direction of the wind power generation unit of the second row in which the rotational force is reduced while passing the wind power generation unit A'1 which is installed in the second row, such that the spiral flow becomes similar to the incident flow of the wind power generation unit A1 installed in the first row and keeps the weakened state even after the wind power generation unit B1 installed in the third row.

Therefore, as shown in FIG. 16d, in order to maintain the effective flow incident angle based on the blade section, a pitch angle is adjusted to the front of the wind power generation unit in such a manner that a pitch angle value becomes a positive number, namely, a + value, and then, a lift force of the blades works in the forward direction, and the blades generate a rotational force in the same direction as the expected rotational direction and some aerodynamic efficiency can be normalized due to the forward rotation of the airfoil type wind section.

In this instance, when pitch control is made in such a manner that an incident angle of the optimum flow and an incident angle of the actual flow accord with each other in the airfoil blade section, it can partially prevent deterioration in aerodynamic efficiency and prevent the aerodynamic vibration.

Additionally, differently from the wind power generation unit A'1 installed in the second row, the wind power generation unit installed in the third row and the wind power generation units installed after the wind power generation unit of the third row, namely, after B1, are weakened in the spirally rotational strength of the inlet flow so as to reduce or minimize the influence of the slipstream of the wind power generation unit installed at the front, thus providing aerodynamic efficiency similar to that of the wind power generation unit A1 installed in the first row.

By the same token, the back and forth (longitudinal) arrangement of the wind power generation units which rotate in the same direction as the wind power generation units installed at the front must keep a sufficient back and forth (longitudinal) interval from the wind power generation units installed at the front, but the back and forth (longitudinal) arrangement of the wind power generation units which rotate in the opposite direction to the wind power generation units installed at the front can reduce or minimize the back and forth (longitudinal) interval so as to increase or maximize the number of the wind power generation units installed in a limited wind farm area.

Figure 5:
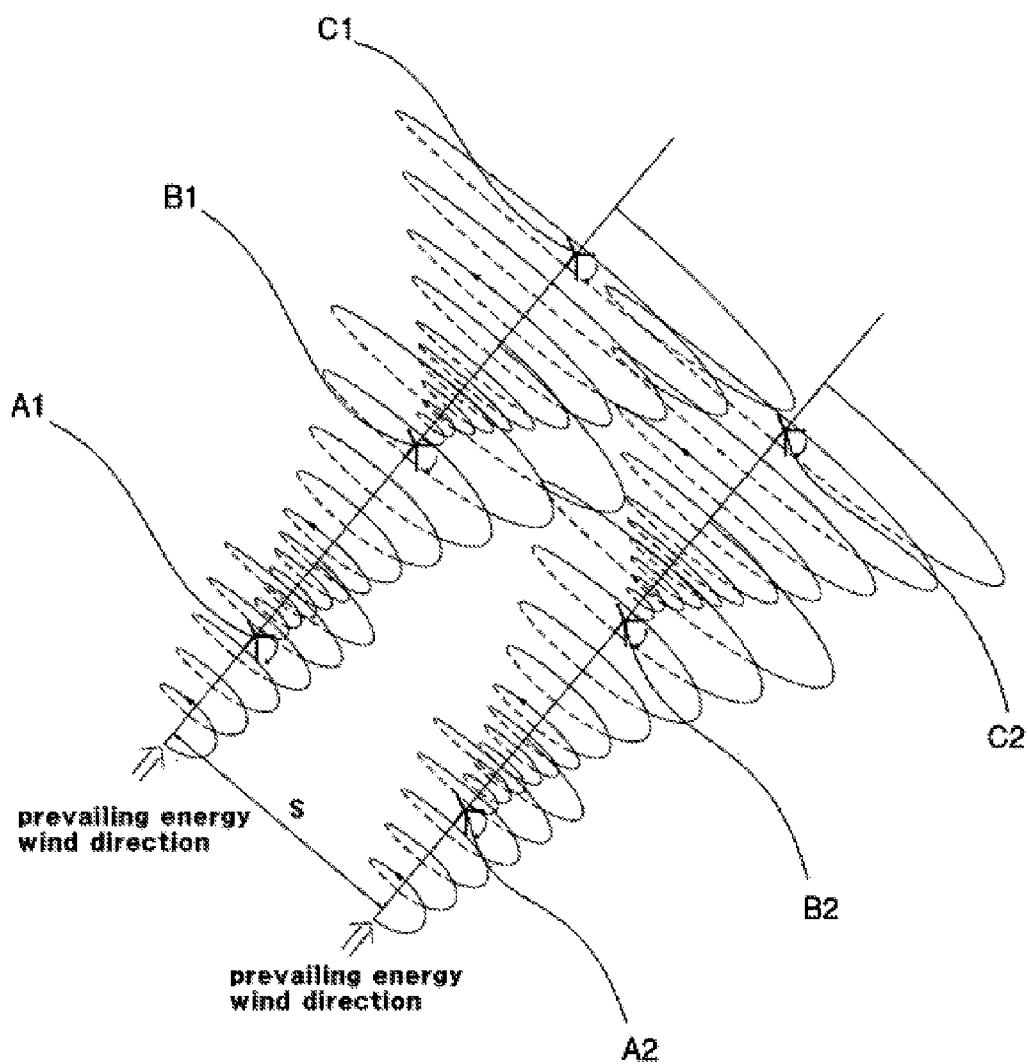
FIG. 5 is a conceptual diagram showing an influence of a transversal vortex of FIG. 2.

Referring to FIGS. 5 and 7b, a problem between the wind power generation units neighboring transversally will be described.

In this case, when the wind power generation units which rotate in the same direction as the transversally neighboring wind power generation units are arranged in a lateral (transversal) direction, a spiral flow which is opposed to the rotational direction of each wind power generation unit is generated at the rear of the wind power generation unit. If the lateral (transversal) interval from the wind power generation units is narrow, the spiral flow collides against another spiral flow and is changed into a unpredictable turbulence because the spiral flows get tangled with each other at the colliding faces due to the same rotational direction thereof, so that flow interaction is deepened and such a phenomenon continuously expands the influence of the slipstream to the wind power generation units which are installed in the next row.

Therefore, because such an arrangement has a bad influence on generation of the aerodynamic efficiency and aerodynamic vibration of the wind power generation units, in order to achieve the expected aerodynamic efficiency, the sufficient lateral (transversal) interval is preferably maintained.

On the other hand, FIGS. 8b and 8c illustrate a case that the wind power generation units neighboring transversally rotate in the opposite direction to each other.

When the wind power generation units which rotate in the opposite direction to the transversally neighboring wind power generation units are arranged in the lateral (transversal) direction, a spiral flow which is opposed to the rotational direction of each wind power generation unit is generated at the rear of the wind power generation unit. If the lateral (transversal) interval from the wind power generation units is narrow, the spiral flow collides against another spiral flow, but can keep the rotation direction of each flow without being tangled with each other at the colliding faces because the rotational direction is opposed, so that flow interaction is reduced and weakened and such a phenomenon is maintained in the wind power generation units installed in the rear row in a state that the influence of the slipstream is weakened.

Therefore, because such an arrangement can reduce or minimize the bad influence on generation of the aerodynamic efficiency and aerodynamic vibration of the wind power generation units, it can improve the expected aerodynamic efficiency even though the lateral (transversal) interval is shorter than the lateral (transversal) arrangement of the wind power generation units which rotate in the same direction.

Moreover, if the pitch control is carried out in order to increase or maximize the aerodynamic efficiency by reducing or minimizing interaction of the spiral flow according to the set lateral (transversal) interval, because size and rotational strength of the spiral flow can be controlled effectively, aerodynamic efficiency can be increased or maximized at the set lateral (transversal) interval.

Furthermore, as shown in FIG. 18, because an interaction range of the spiral flow can be controlled when the lateral (transversal) directions of the wind power generation units are individually and properly controlled through a yaw control with the wind power generation units neighboring laterally, the aerodynamic efficiency can be increased or maximized at the set lateral (transversal) interval.

By the same token, the lateral (transversal) arrangement of the wind power generation units which rotate in the same direction as the wind power generation units neighboring laterally keep a sufficient lateral (transversal) interval from the wind power generation units installed laterally, but the lateral (transversal) interval can be reduced or minimized in the wind power generation units which are installed in the lateral (transversal) arrangement because the rotational direction is set in the opposite direction to the wind power generation units neighboring laterally and the rotational direction, size, rotational strength and the interaction range of the spiral flow can be controlled through pitch control and yaw control, so that the number of the wind power generation units installed in a limited wind farm area can be increased or maximized.

The position relations used to describe the embodiments of the present disclosure are described referring to the attached drawings and can be varied according to aspects of the embodiments.

Additionally, unless otherwise defined herein, it will be understood that all words or terms used in the specification and claims should be interpreted as the meaning defined in commonly used dictionaries in the art. It will be further understood that the words or terms should be interpreted as having a meaning that is consistent with their meaning in the context of the relevant art and the technical idea of the invention, and should not be interpreted as excessively ideal or formal meaning unless otherwise defined clearly.

While the present invention has been particularly shown and described with reference to the preferred embodiments thereof, it will be understood by those of ordinary skill in the art that simple combinations of the preferred embodiments of the present invention with the conventional inventions or the prior arts or simple modifications of the present invention various changes and modifications belong to the technical scope of the present invention. Further, the embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A wind farm, comprising:
   at least two first-direction wind power generation units that are spaced apart from each other at a predetermined interval and have blades that rotate in a same direction;
   at least one second-direction wind power generation unit that is located adjacent to and between the first-direction wind power generation units and has blades that rotate in an opposite direction to the rotational direction of the first-direction wind power generation units;
   a wind speed sensor that measures wind speed and direction;
   a vortex sensor that senses at least one of strength and direction of a vortex disposed at at least one wind power generating unit of the first-direction and second-direction wind power generation units; and
   a controller configured to
   determine, for each wind power generation unit, a vector value for an expected strength and direction of an incident wind at the wind power generation unit by combining the wind speed and direction measurement and the strength and direction of the vortex measurement, and
   control one of the wind power generation units based on the expected strength and direction of the incident wind.

2. The wind farm according to claim 1, wherein the first-direction wind power generation units are spaced apart from each other at a predetermined interval in a longitudinal direction, and the second-direction wind power generation units are located between the first-direction wind power generation units in the longitudinal direction.

3. The wind farm according to claim 1, wherein the first-direction wind power generation units are spaced apart from each other at a predetermined interval in a transversal direction, and the second-direction wind power generation units are located between the first-direction wind power generation units in the transversal direction.

4. The wind farm according to claim 1, wherein at least one first-direction wind power generation unit and at least one second-direction wind power generation unit are arranged alternatingly in a longitudinal direction.

5. The wind farm according to claim 1, wherein at least one wind power generating unit of the first-direction and second-direction wind power generation units include a vibration sensor that senses vibration of rotating blades.

6. The wind farm according to claim 1, wherein each of the wind power generation units further comprises a controller configured to individually control a rotational speed of the blades of the wind power generation unit according to a degree of the vortex measured by the vortex sensor.

7. The wind farm according to claim 6, wherein the controller is configured to
   determine a control mode when the degree of the vortex is more than a predetermined value, and determine a normal mode when the degree of the vortex is less than the predetermined value, and
   control the rotational speed of the blades to be decelerated when the respective wind power generation unit is determined to be in the control mode.

8. The wind farm according to claim 5, wherein each of the wind power generation units further comprises a controller configured to control a rotational speed of the blades of the wind power generation unit according to the degree of vibration measured by the vibration sensor.

9. The wind farm according to claim 8, wherein the controller is configured to
   determine a control mode when the degree of vibration is more than a predetermined value, and determine a normal mode when the degree of vibration is less than the predetermined value, and
   control the rotational speed of the blades to be decelerated when the respective wind power generation unit is determined to be in the control mode.

10. The wind farm according to claim 7, wherein the deceleration control of the rotational speed includes at least one of:
    i) blade pitch control;
    ii) control of a hub brake that is disposed between a hub and a nacelle frame;

iii) control of a shaft brake that is disposed between the hub and a generator that decelerates a shaft that transfers a rotational force of the blades to the generator; and
iv) control of an inner generator brake that is disposed inside the generator that decelerates a rotational speed of a generator rotor.

11. The wind farm according to claim 7, wherein
the wind power generation units that are installed in a transversal direction define a group by rows or the wind power generation units which are installed in a longitudinal direction define a group by columns,
an average value of values measured from the vortex sensors mounted on the wind power generation units of the group is determined, and
the groups defined by rows or columns are controlled together on the basis of the average value.

12. The wind farm according to claim 11, wherein
additional groups are defined by odd rows and by even rows or by odd columns and by even columns,
a second average value of values measured from the vortex sensors mounted on the wind power generation units of the additional groups is determined, and
the additional groups are controlled together on the basis of the second average value.

13. The wind farm according to claim 7, wherein
the wind power generation units define a group by a certain area unit,
an average value of values measured from the vortex sensors mounted on the wind power generation units of the group is determined, and
the group by the certain area unit is controlled together on the basis of the average value.

14. The wind farm according to claim 9, wherein the deceleration control of the rotational speed includes at least one of:
i) blade pitch control;
ii) control of a hub brake that is disposed between a hub and a nacelle frame;
iii) control of a shaft brake that is disposed between the hub and a generator that decelerates a shaft that transfers a rotational force of the blades to the generator; and
iv) control of an inner generator brake that is disposed inside the generator that decelerates a rotational speed of a generator rotor.

15. The wind farm according to claim 9, wherein
the wind power generation units that are installed in a transversal direction define a group by rows or the wind power generation units which are installed in a longitudinal direction define a group by columns,
an average value of values measured from the vibration sensors mounted on the wind power generation units of the group is determined, and
the groups defined by rows or columns are controlled together on the basis of the average value.

16. The wind farm according to claim 15, wherein
additional groups are defined by odd rows and by even rows or by odd columns and by even columns,
a second average value of values measured from the vibration sensors mounted on the wind power generation units of the additional groups is determined, and
the additional groups are controlled together on the basis of the second average value.

17. The wind farm according to claim 9, wherein
the wind power generation units define a group by a certain area unit,
an average value of values measured from the vibration sensors mounted on the wind power generation units of the group is determined, and
the group by the certain area unit is controlled together on the basis of the average value.

18. A control method of a wind farm, comprising:
rotating blades of at least two first-direction wind power generation units, which are spaced apart from each other at a predetermined interval, in a same direction;
rotating blades of at least one second-direction wind power generation units, which is located adjacent to and between the first-direction wind power generation units, in an opposite direction to the rotational direction of the first-direction wind power generation units;
measuring average wind speed and direction around the wind farm;
measuring strength and direction of a vortex using a vortex sensor mounted on each of the wind power generation units;
determining, for each wind power generation unit, a vector value for an expected strength and direction of an incident wind at the wind power generation unit by combining the measured wind speed and direction of the measured strength and direction of the vortex; and
controlling the wind power generation units based on the expected strength and direction of the incident wind.

19. An arrangement structure of a wind farm in which:
at least two first-direction wind power generation units that are spaced apart from each other at a predetermined interval rotate in a same direction; and
at least one second-direction wind power generation unit that is disposed adjacent to and between the neighboring first-direction wind power generation units rotates in an opposite direction to the rotational direction of the first-direction wind power generating units, wherein
a wind speed sensor measures wind speed and direction;
a vortex sensor that at least one of strength and direction of a vortex disposed at at least one wind power generating unit of the first-direction and second-direction wind power generation units; and
a controller is configured to
determine, for each wind power generation unit, a vector value for an expected strength and direction of an incident wind at the wind power generation unit by combining the wind speed and direction measurement and the strength and direction of the vortex measurement, and
control one of the wind power generation units based on the expected strength and direction of the incident wind.

20. The arrangement structure of the wind farm according to claim 19, wherein the first-direction wind power generation units are spaced apart from each other at a predetermined interval in a longitudinal direction, and the second-direction wind power generation units are located between the first-direction wind power generation units in the longitudinal direction.

21. The arrangement structure of the wind farm according to claim 19, wherein at least one first-direction wind power generation unit and at least one second-direction wind power generation unit are installed alternatingly in the longitudinal direction.

22. The arrangement structure of the wind farm according to claim 19, wherein the first-direction wind power generation units are spaced apart from each other at a predetermined interval in a transversal direction, and the second-direction wind power generation units are located between the first-direction wind power generation units in the transversal direction.

* * * * *